Sept. 19, 1939.  H. O. RONNING ET AL  2,173,313
MACHINE FOR MAKING GARMENT HANGERS
Filed March 28, 1938   26 Sheets-Sheet 1
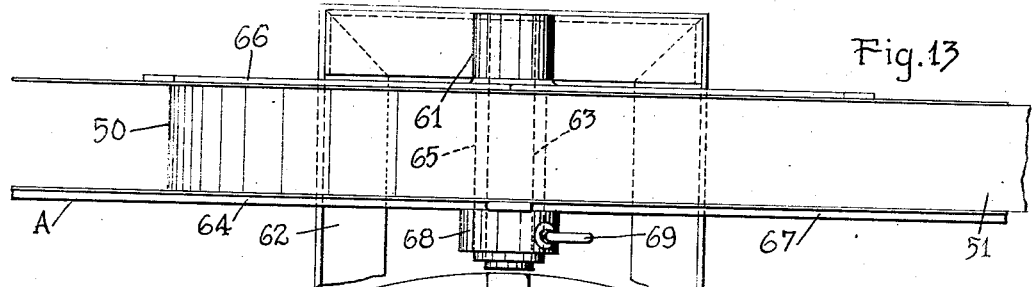
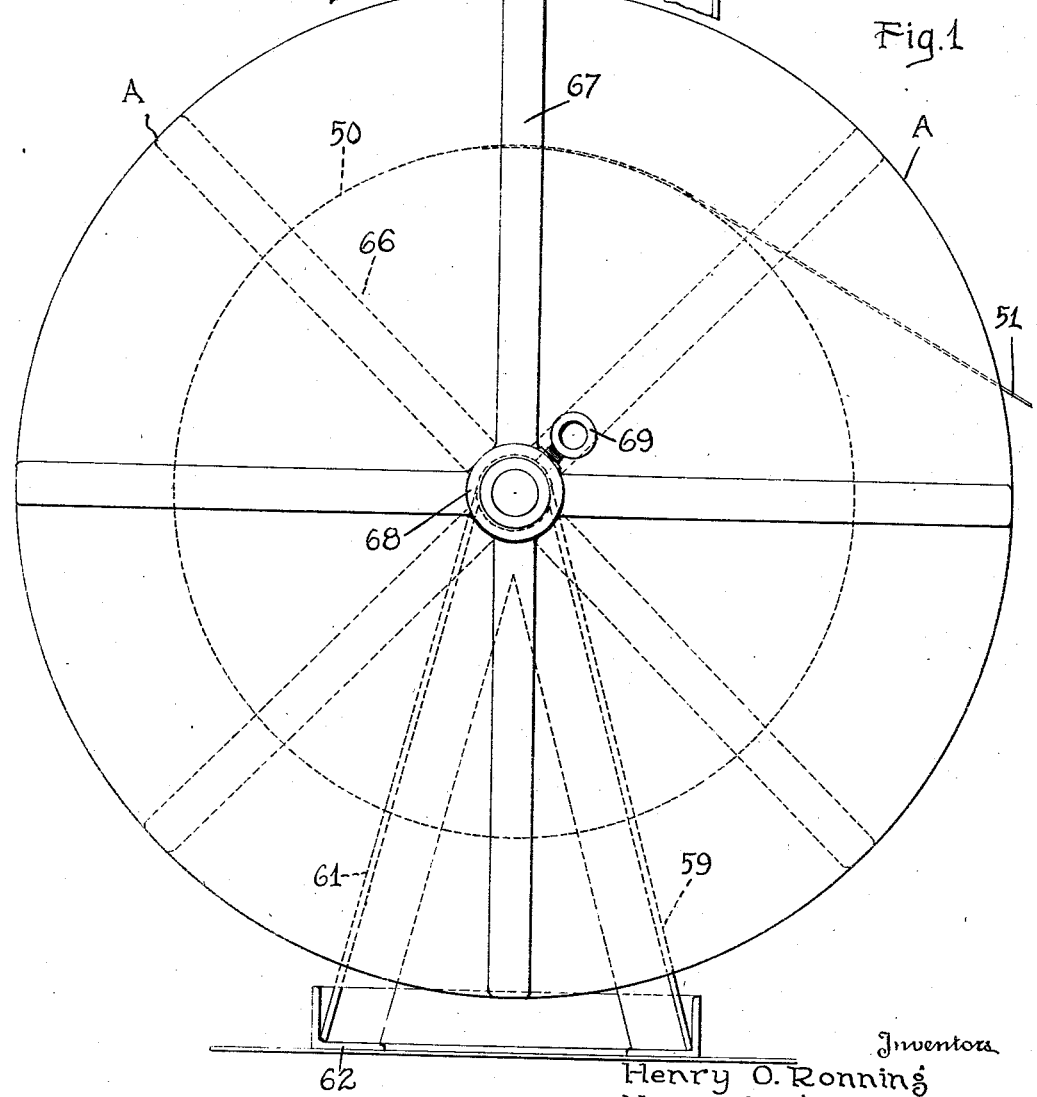
Inventors
Henry O. Ronning
Harry E. Cullen
Edwin G. Monson and
Nels H. Sandberg
By Caswell & Lagaard

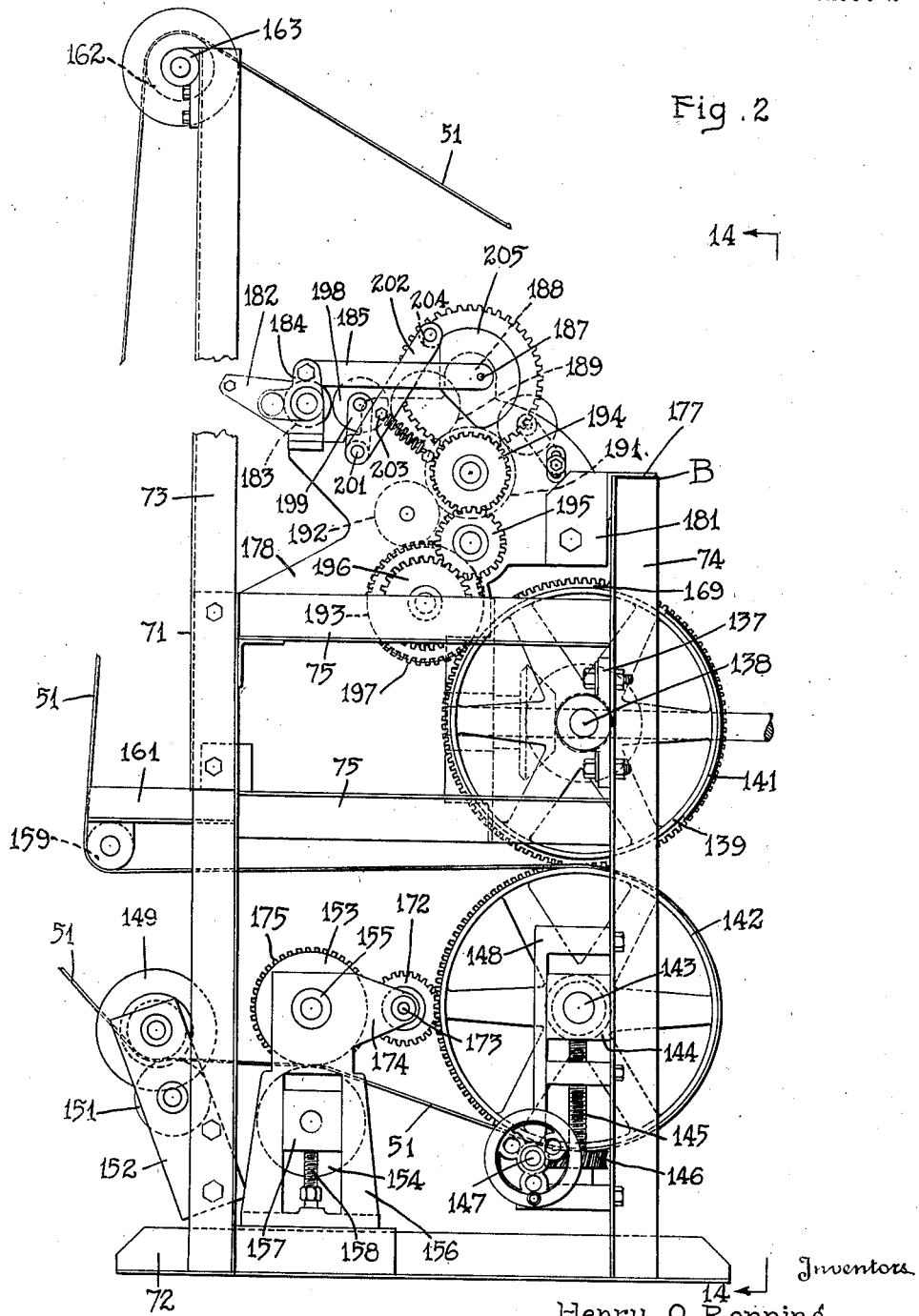

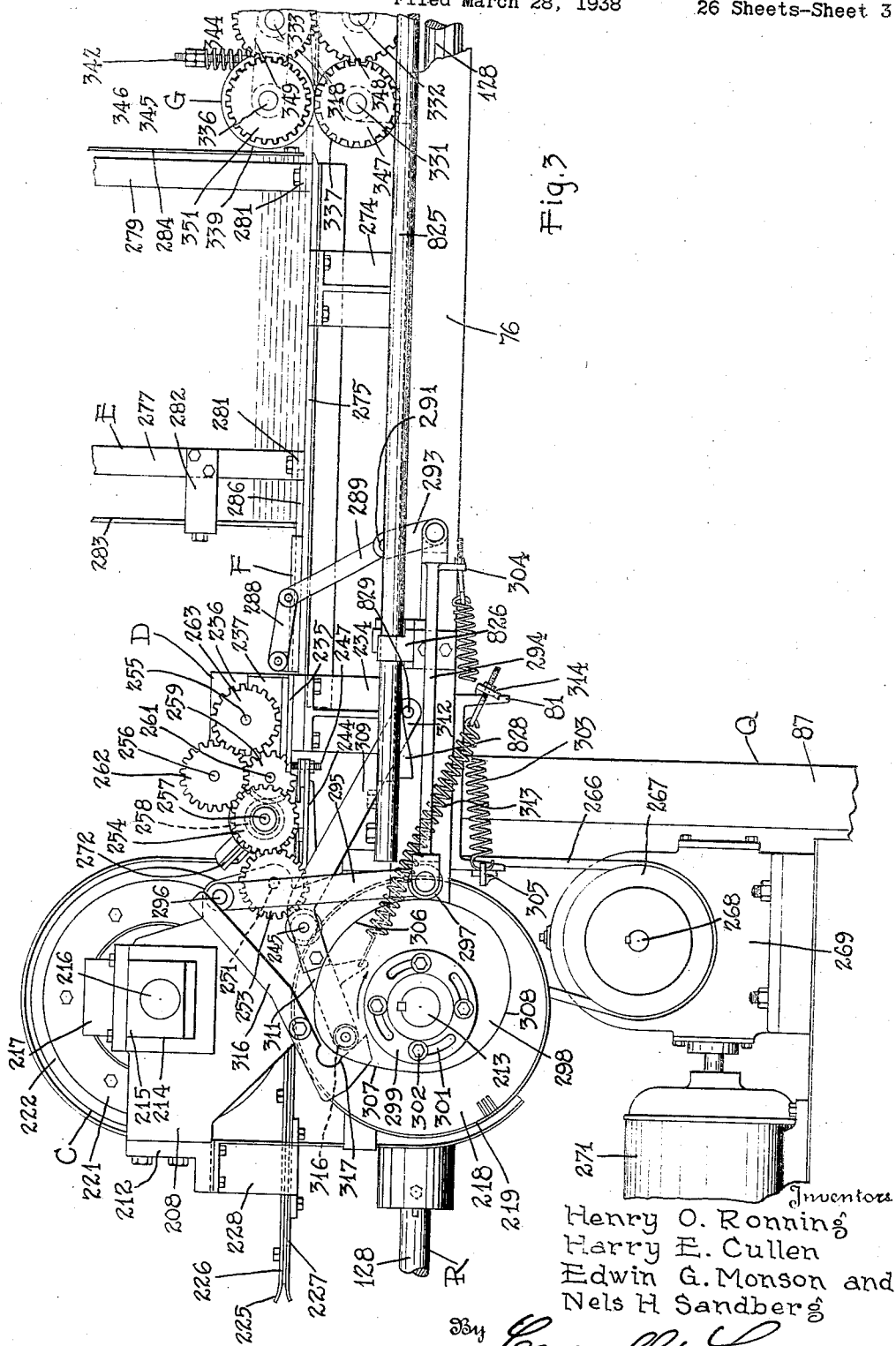

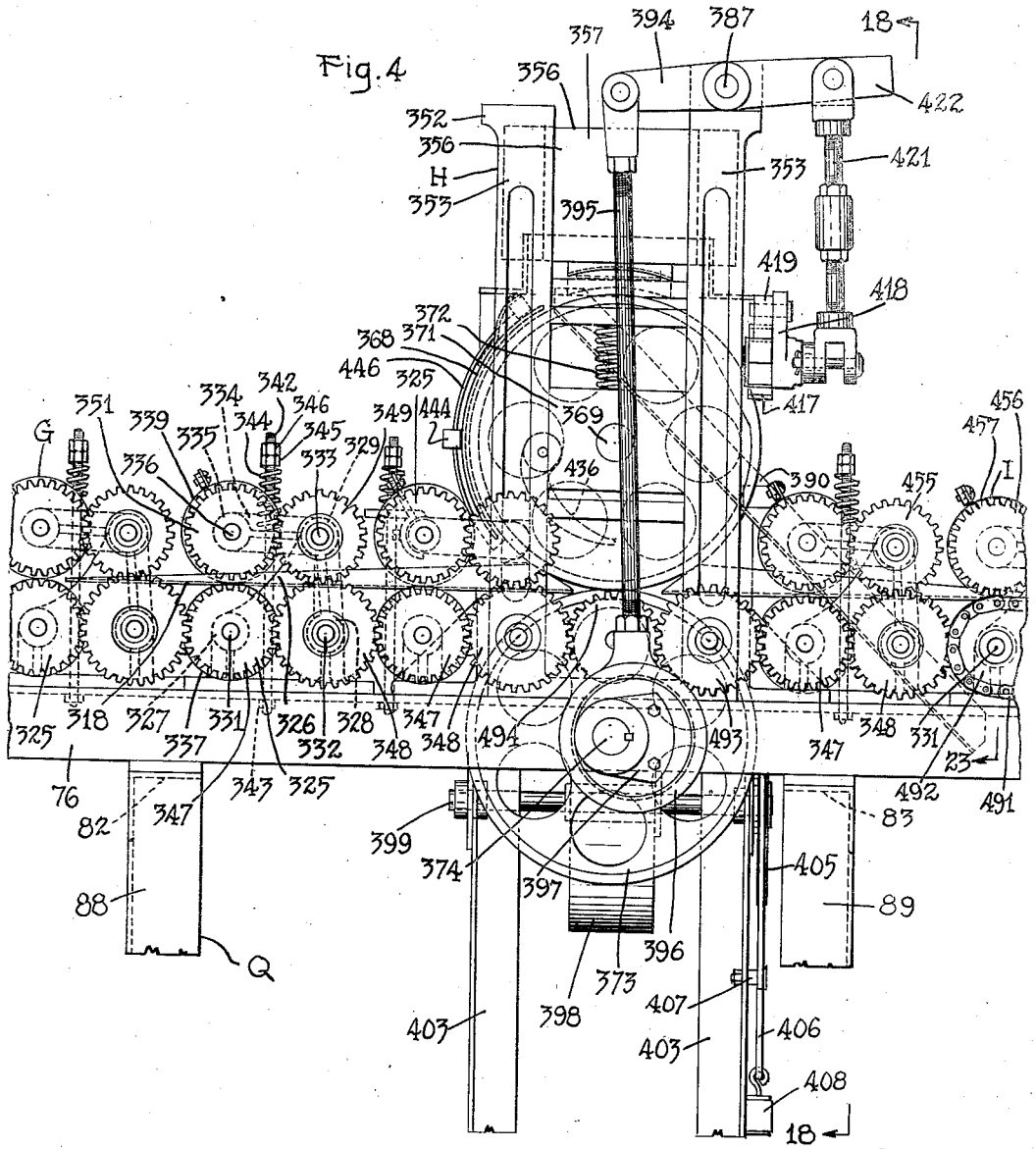

Sept. 19, 1939.  H. O. RONNING ET AL  2,173,313
MACHINE FOR MAKING GARMENT HANGERS
Filed March 28, 1938  26 Sheets-Sheet 5
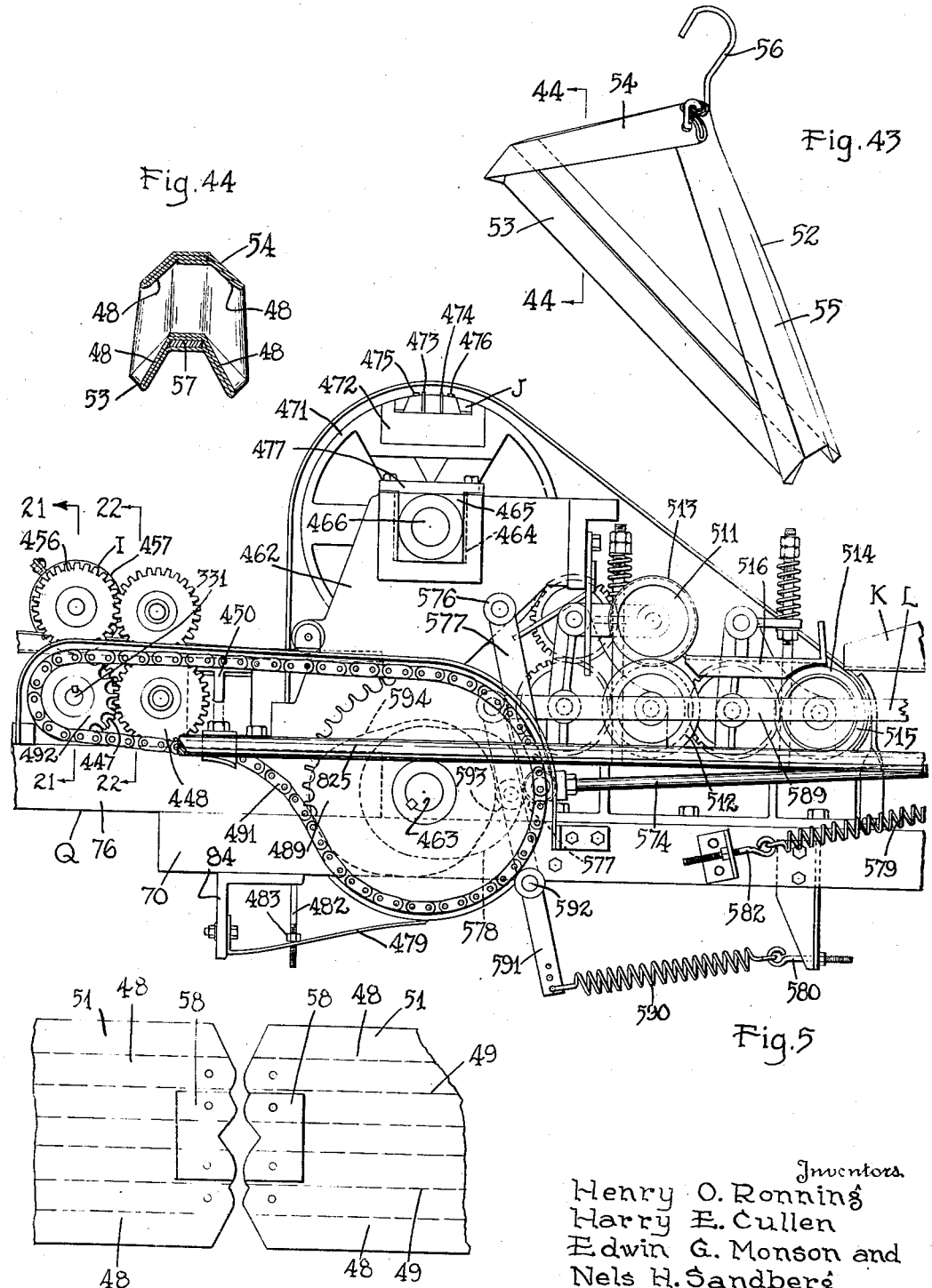
Inventors.
Henry O. Ronning
Harry E. Cullen
Edwin G. Monson and
Nels H. Sandberg
By Caswell & Lagaard Sept. 19, 1939.  H. O. RONNING ET AL  2,173,313
MACHINE FOR MAKING GARMENT HANGERS
Filed March 28, 1938   26 Sheets-Sheet 6

Inventors
Henry O. Ronning
Harry E. Cullen
Edwin G. Monson and
Nels H. Sandberg
By Caswell & Lagaard

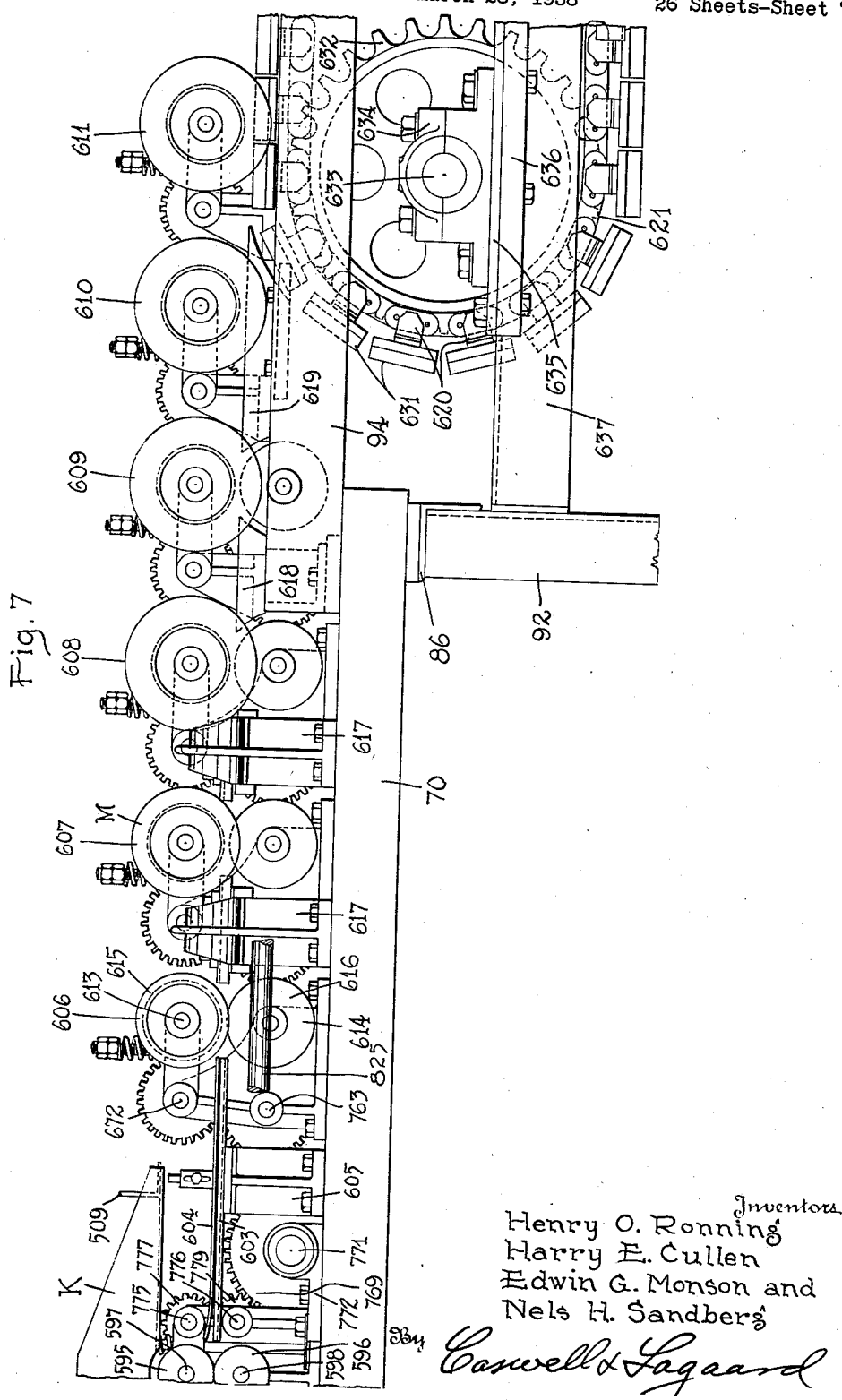

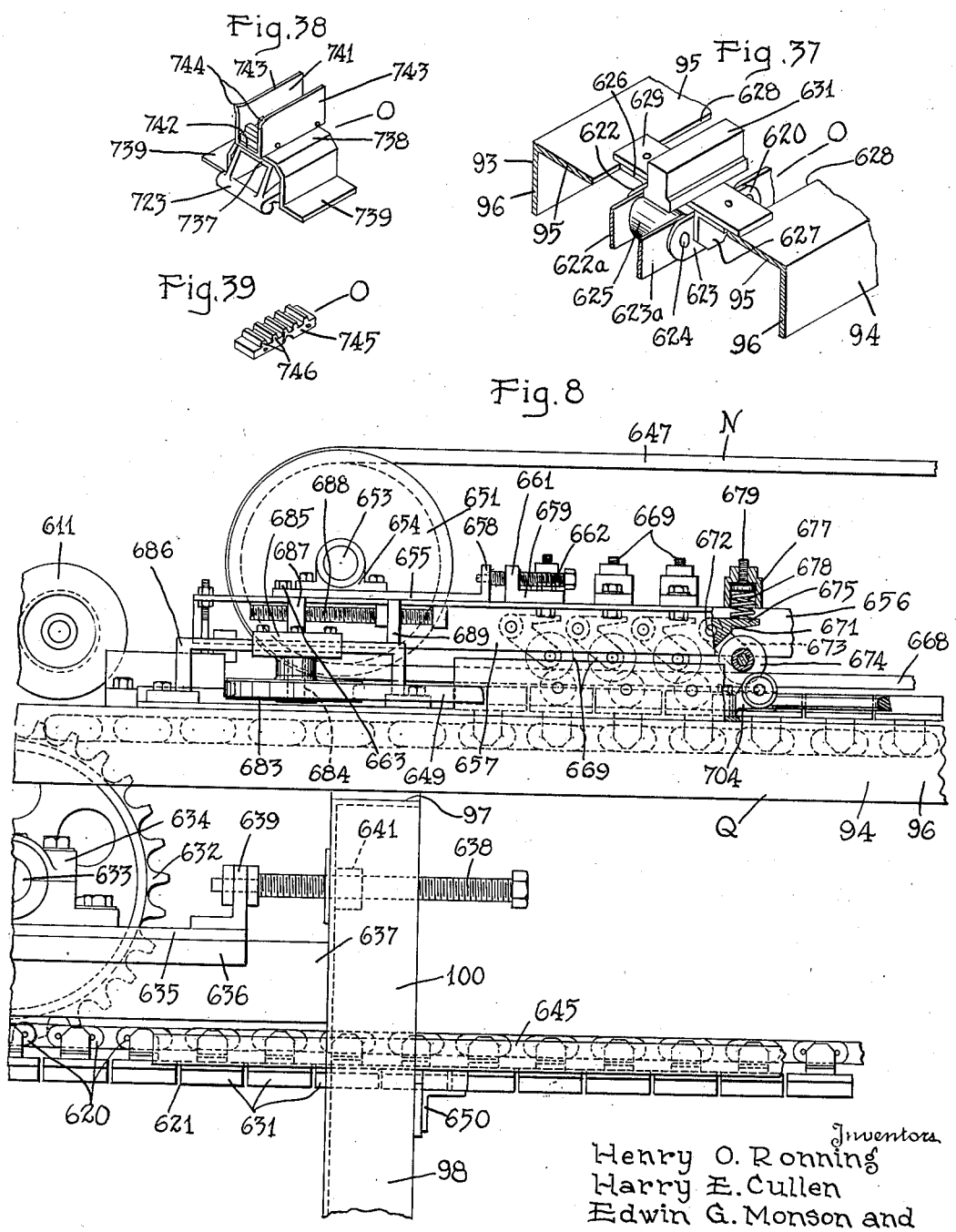

Sept. 19, 1939.  H. O. RONNING ET AL  2,173,313
MACHINE FOR MAKING GARMENT HANGERS
Filed March 28, 1938   26 Sheets-Sheet 9
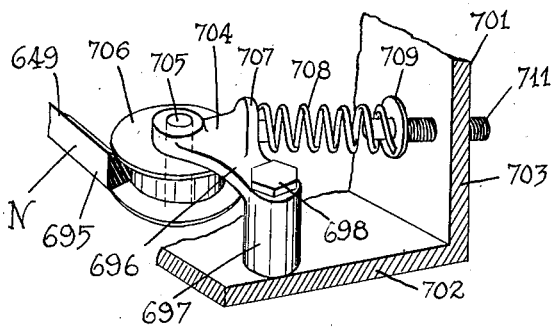
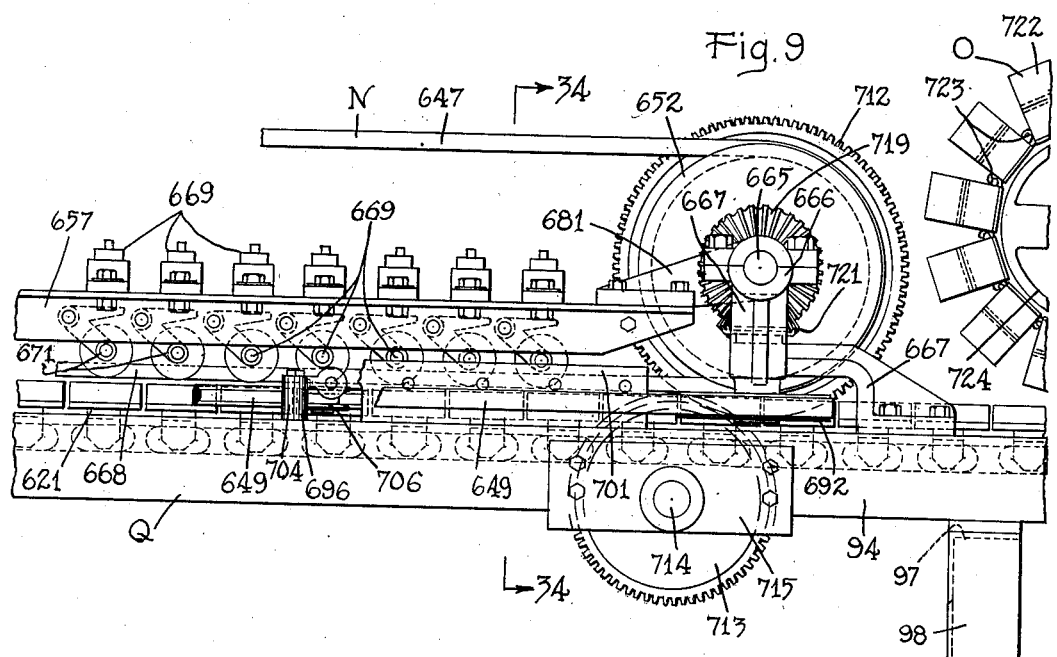
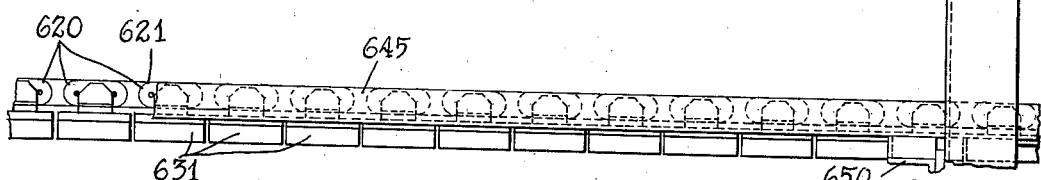
Inventors
Henry O. Roning
Harry E. Cullen
Edwin G. Monson and
Nels H. Sandberg
By Caswell & Lagaard Sept. 19, 1939.  H. O. RONNING ET AL  2,173,313
MACHINE FOR MAKING GARMENT HANGERS
Filed March 28, 1938   26 Sheets-Sheet 10
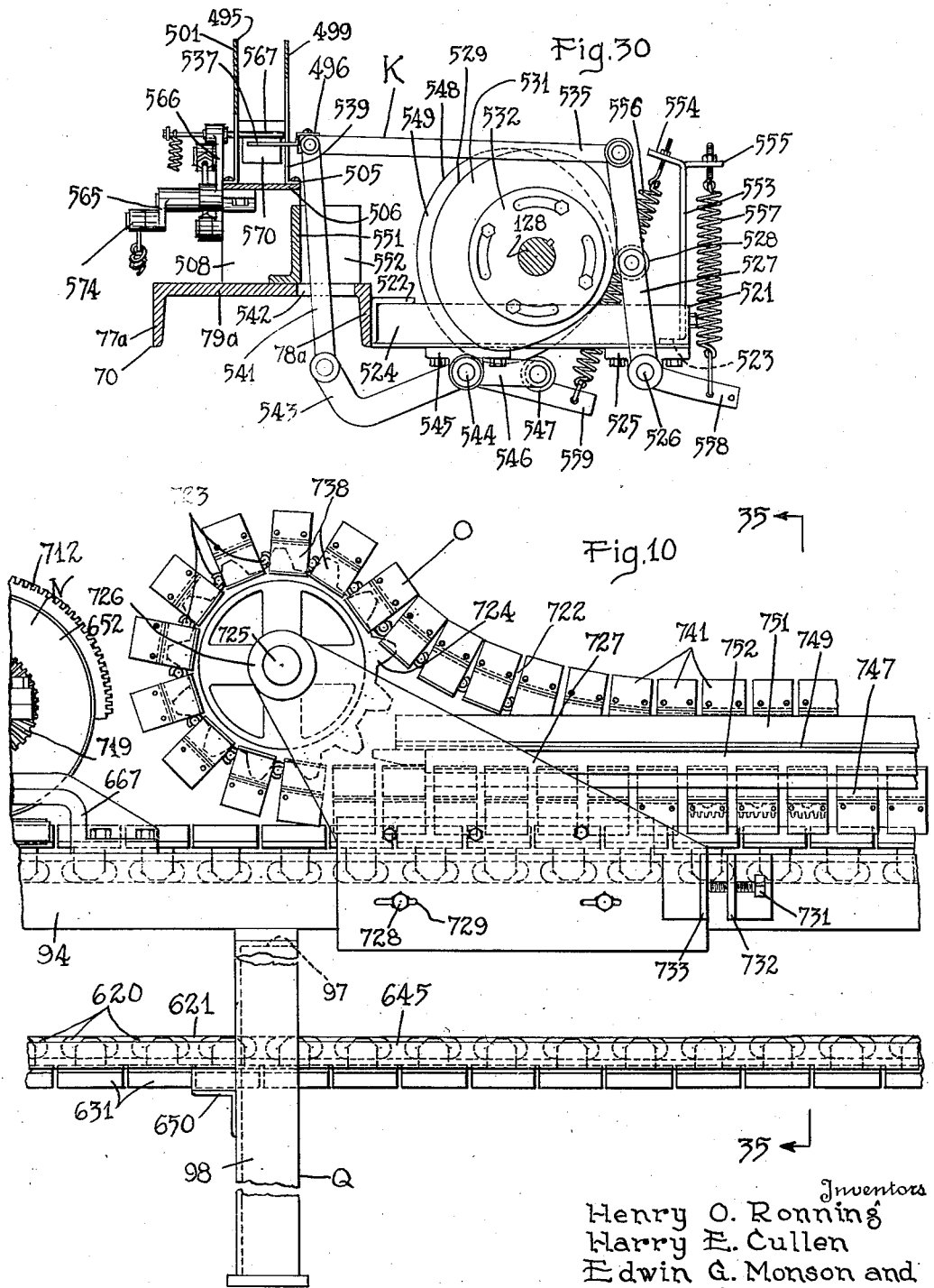
Inventors
Henry O. Ronning
Harry E. Cullen
Edwin G. Monson and
Nels H Sandberg
By Caswell & Lagaard Sept. 19, 1939.  H. O. RONNING ET AL  2,173,313
MACHINE FOR MAKING GARMENT HANGERS
Filed March 28, 1938    26 Sheets-Sheet 11
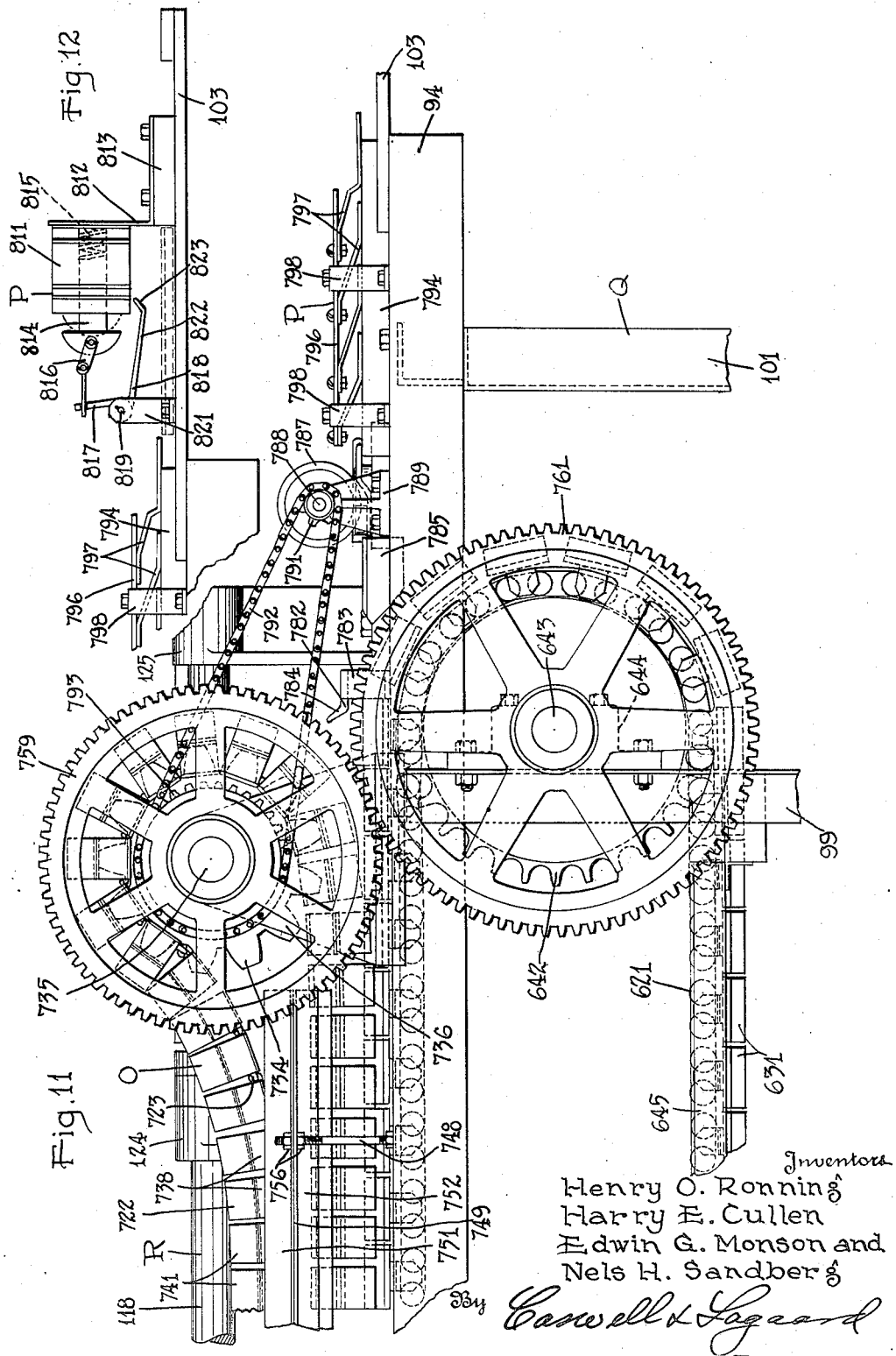
Inventors
Henry O. Ronning,
Harry E. Cullen,
Edwin G. Monson and
Nels H. Sandberg
By Caswell & Lagaard

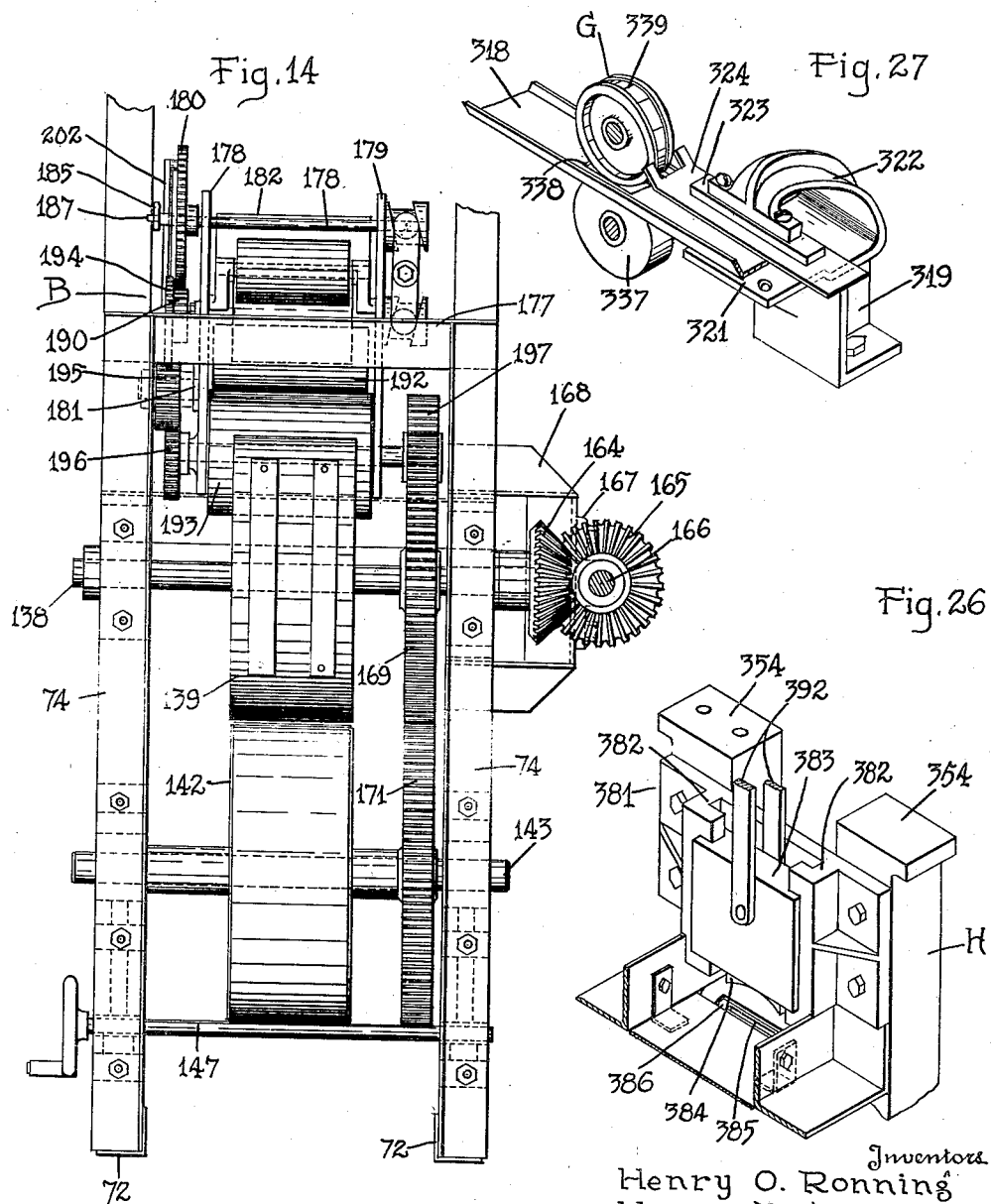

Sept. 19, 1939.　　H. O. RONNING ET AL　　2,173,313
MACHINE FOR MAKING GARMENT HANGERS
Filed March 28, 1938　　26 Sheets-Sheet 13
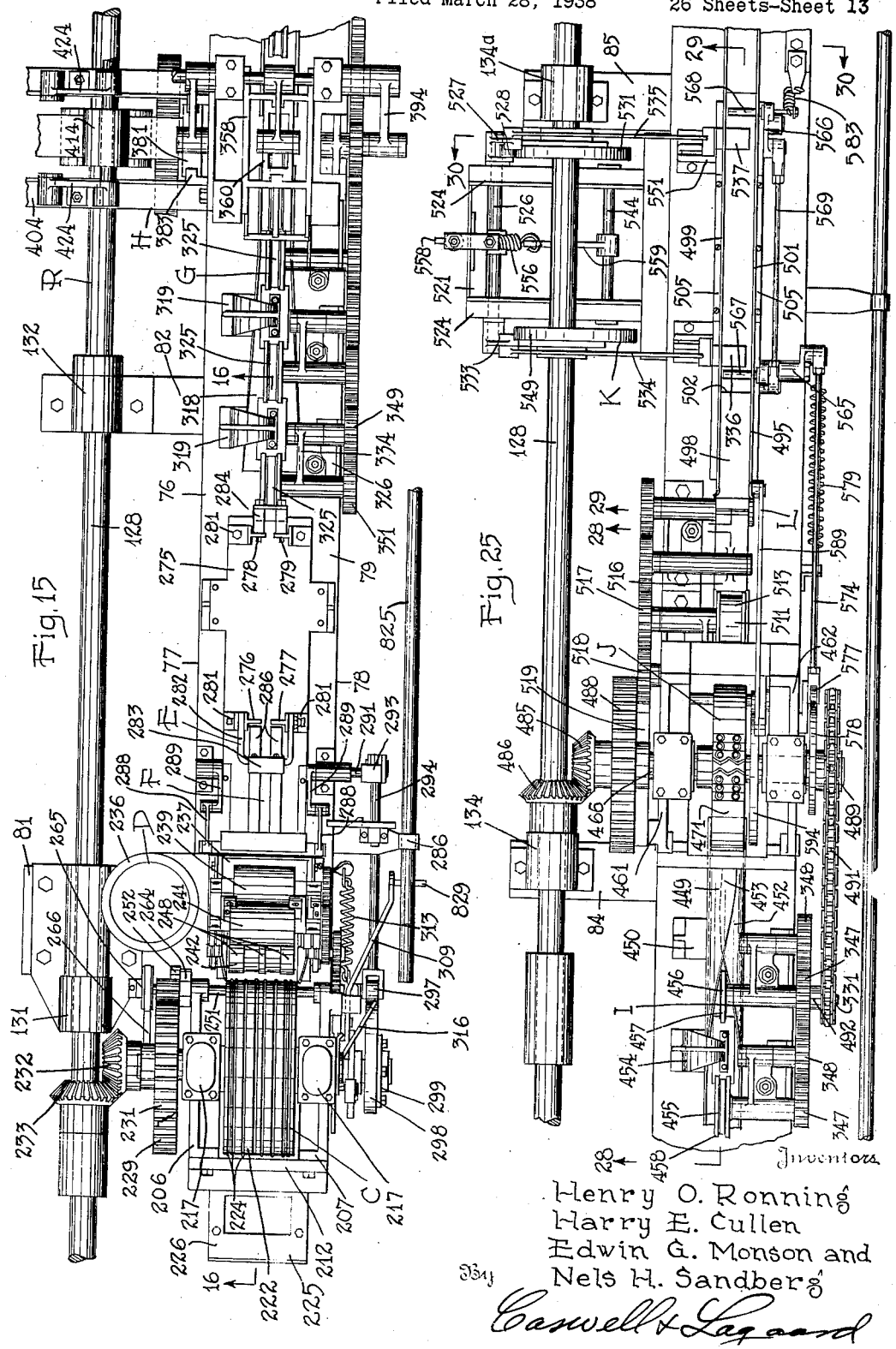
Inventors
Henry O. Ronning
Harry E. Cullen
Edwin G. Monson and
Nels H. Sandberg
Caswell & Lagaard

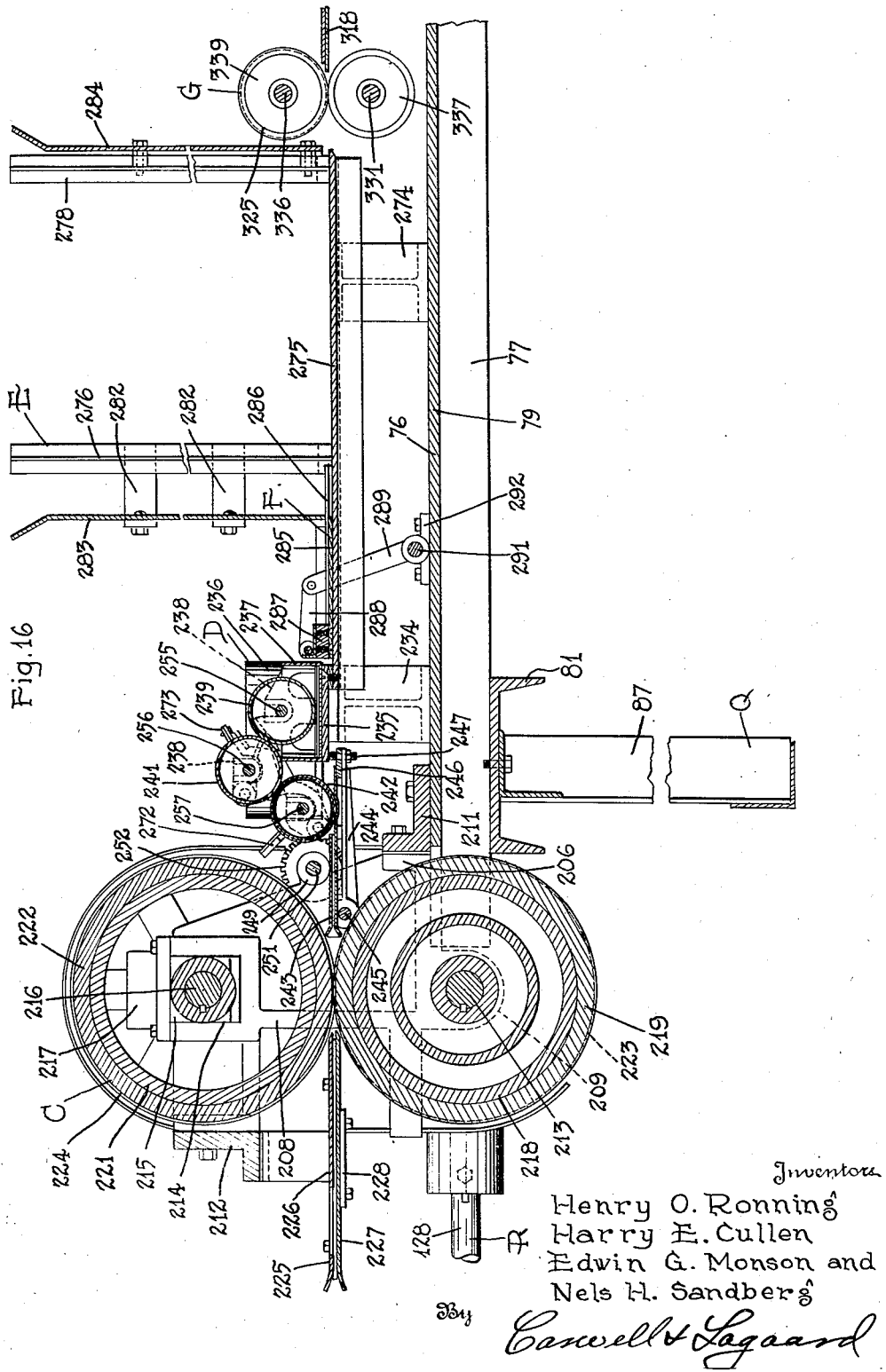

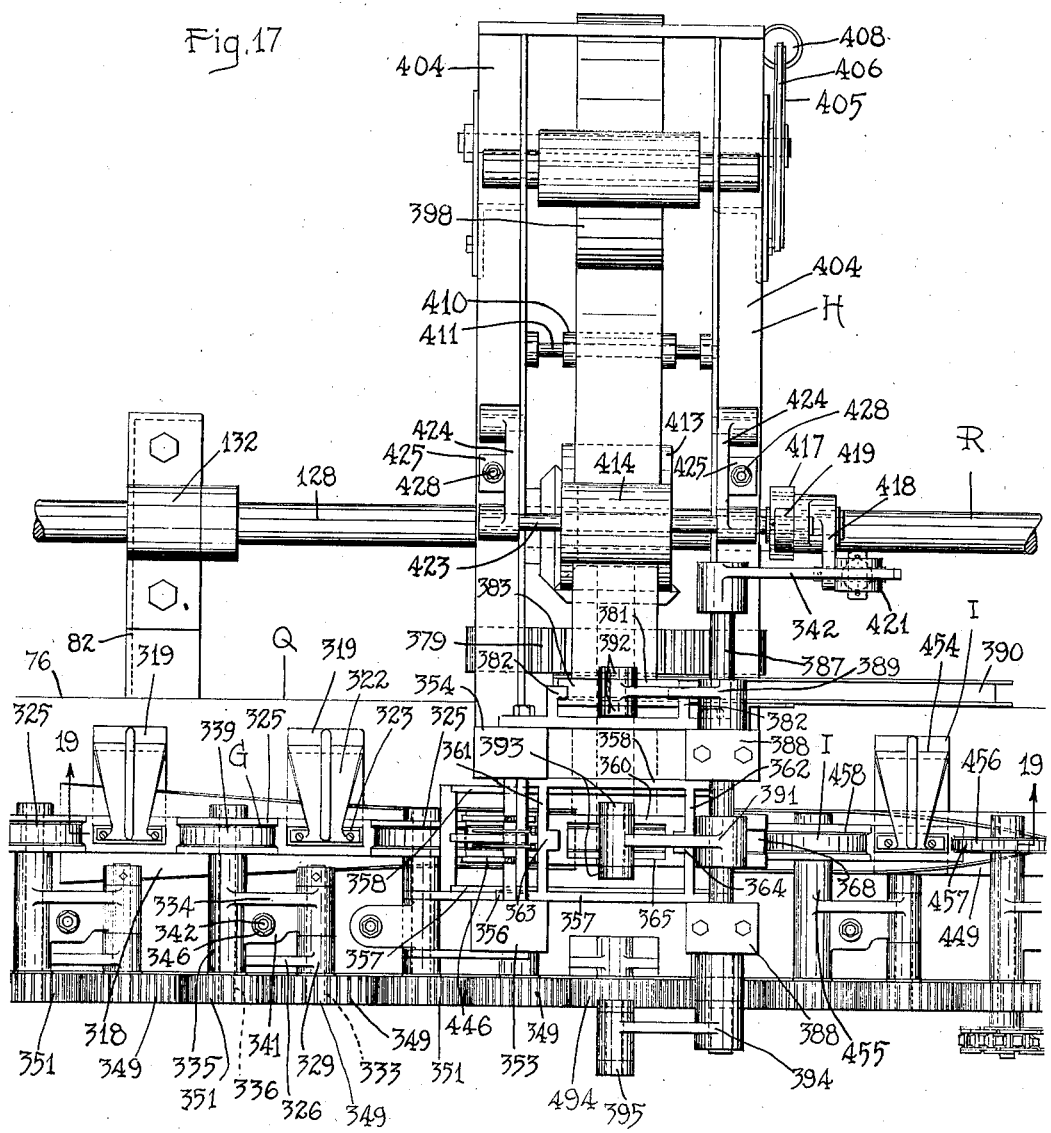

Sept. 19, 1939. H. O. RONNING ET AL 2,173,313
MACHINE FOR MAKING GARMENT HANGERS
Filed March 28, 1938 26 Sheets-Sheet 16

Inventors
Henry O. Ronning
Harry E. Cullen
Edwin G. Monson and
Nels H. Sandberg
By Caswell & Fagaard

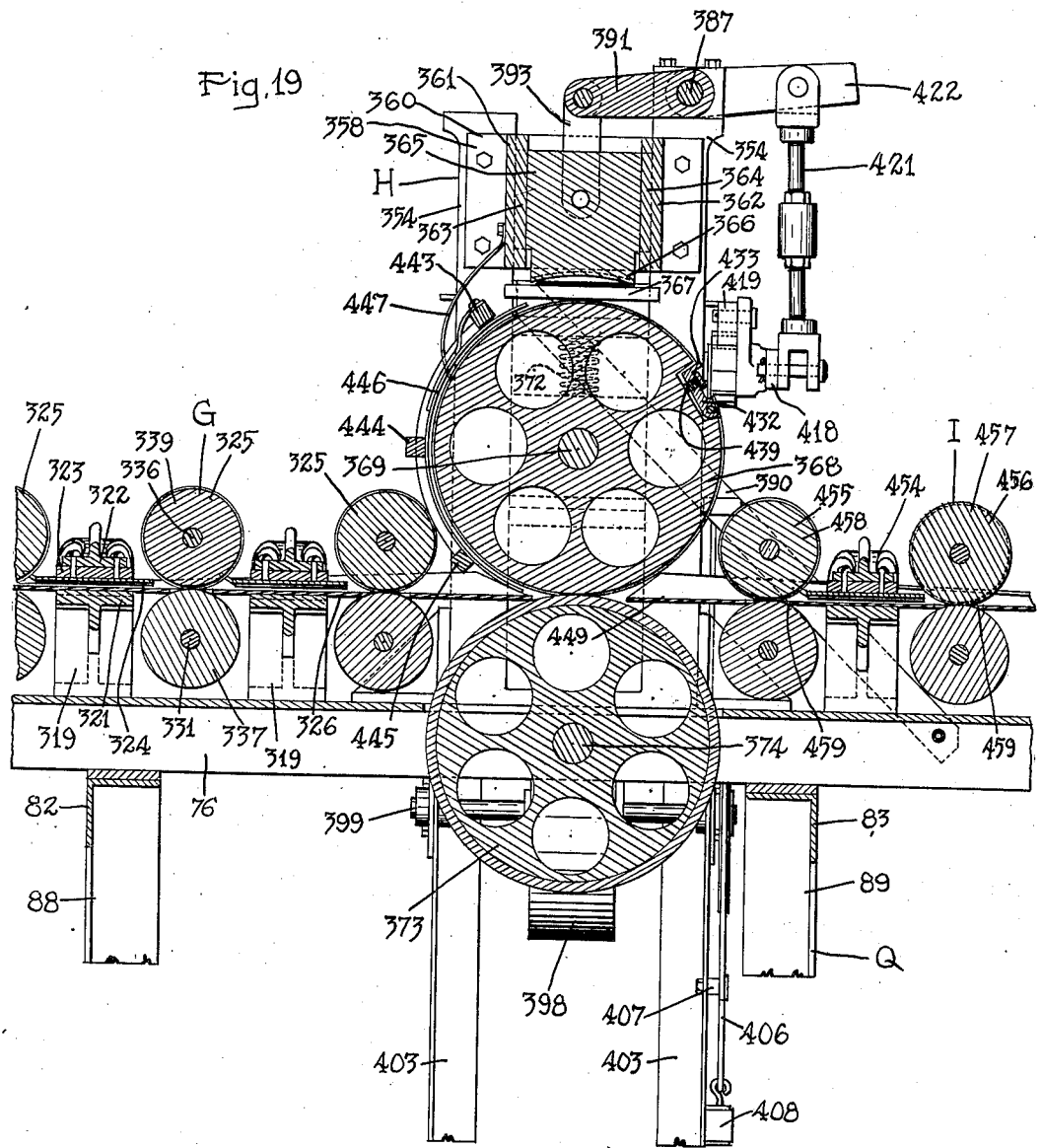

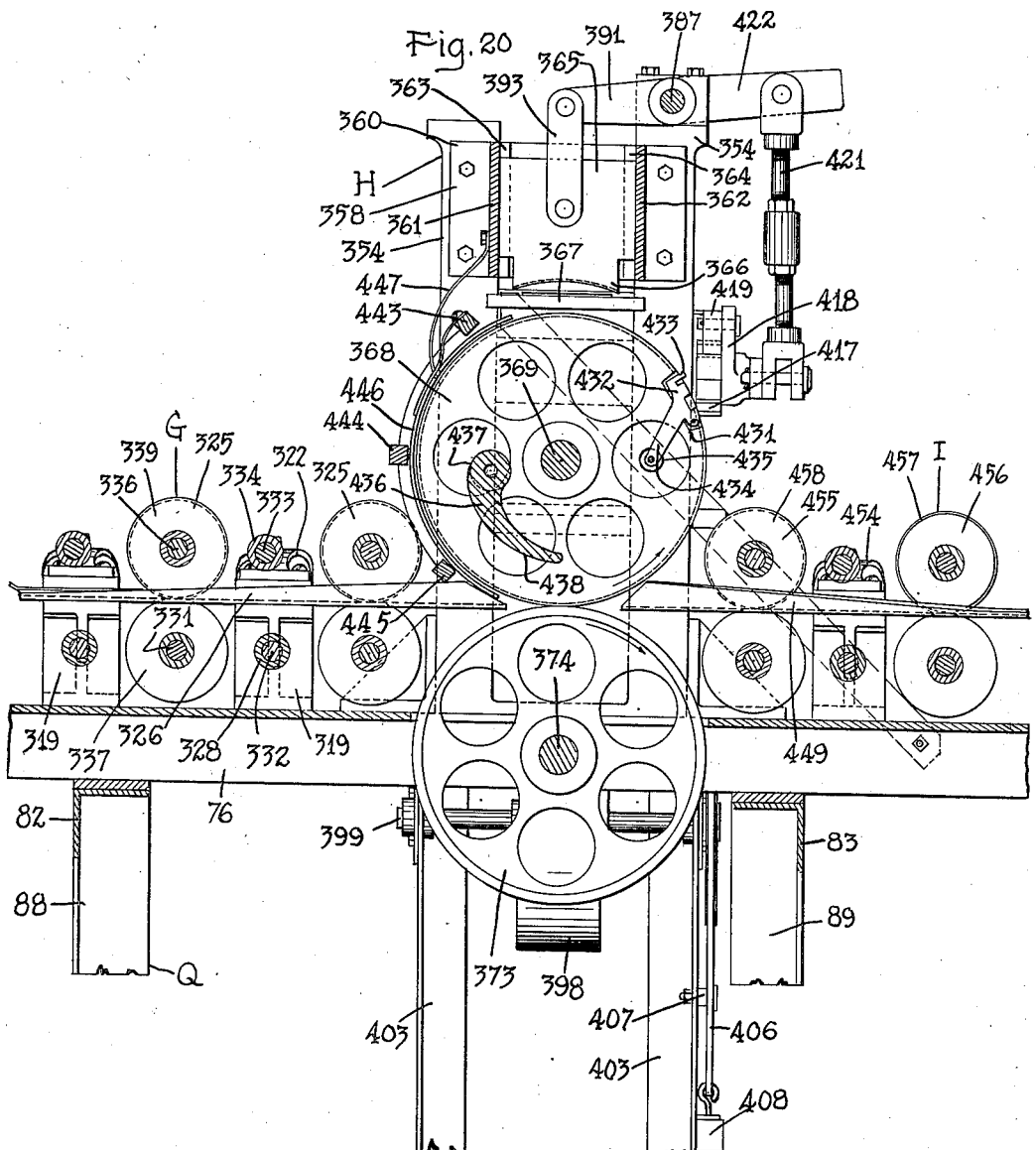

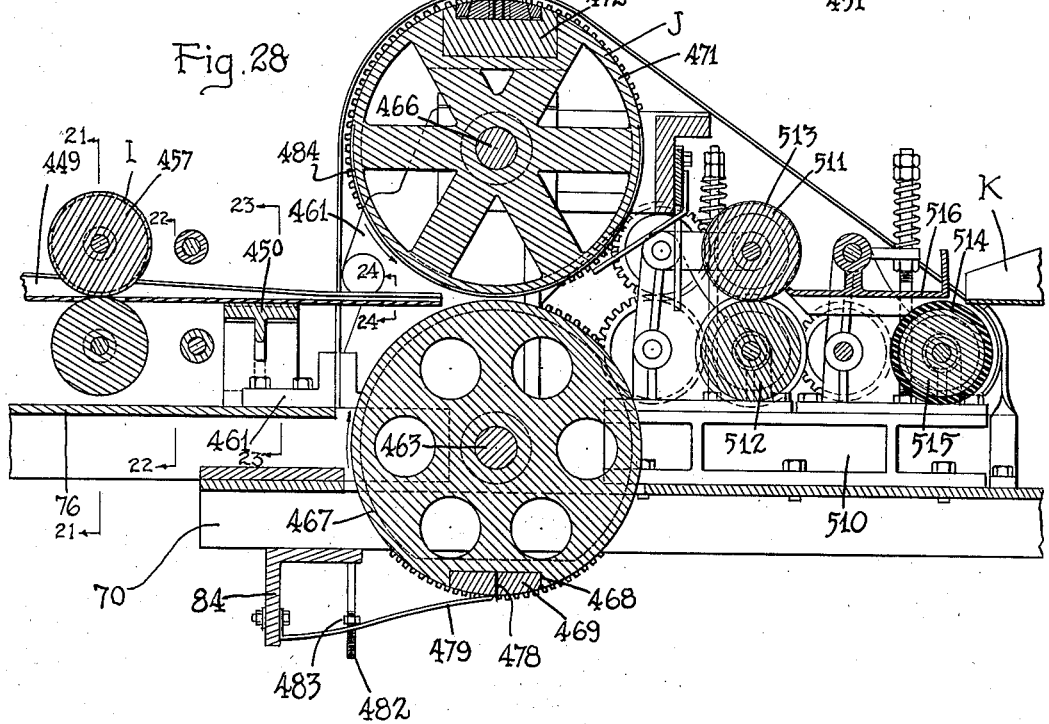

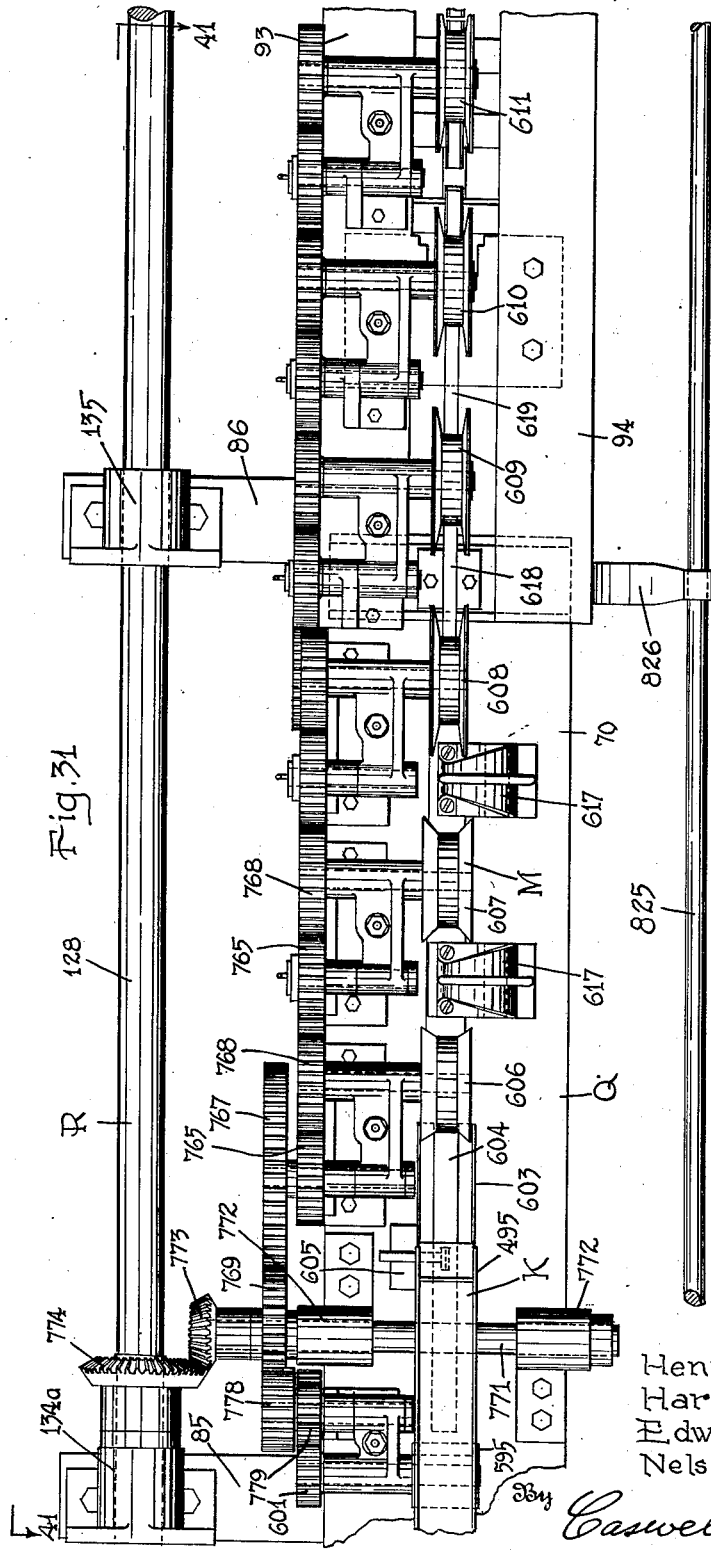

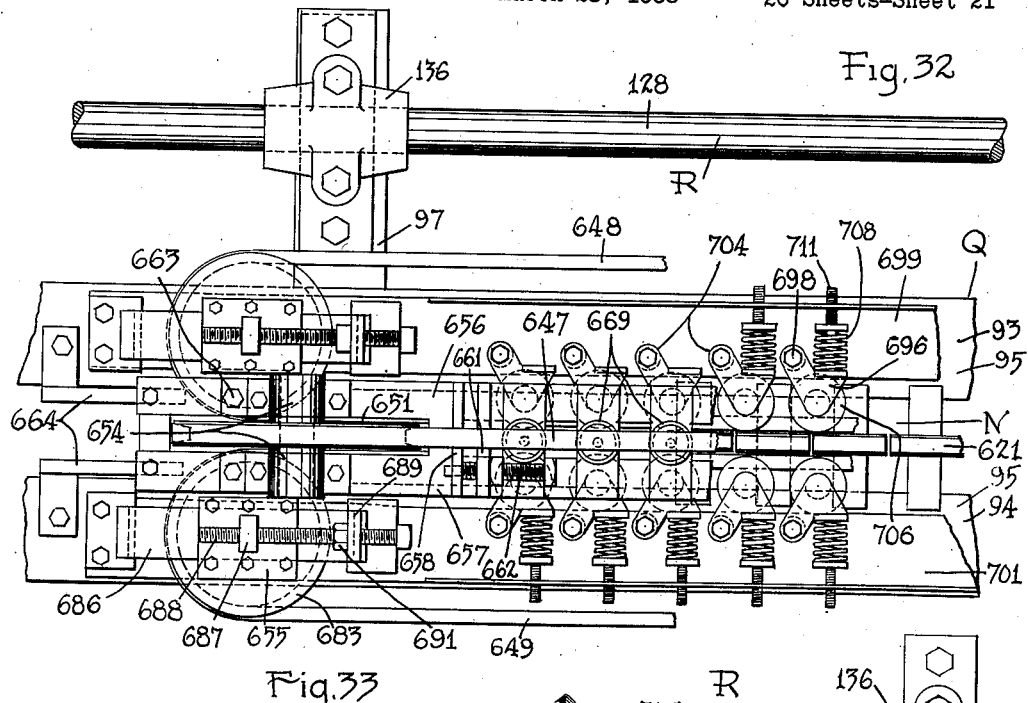
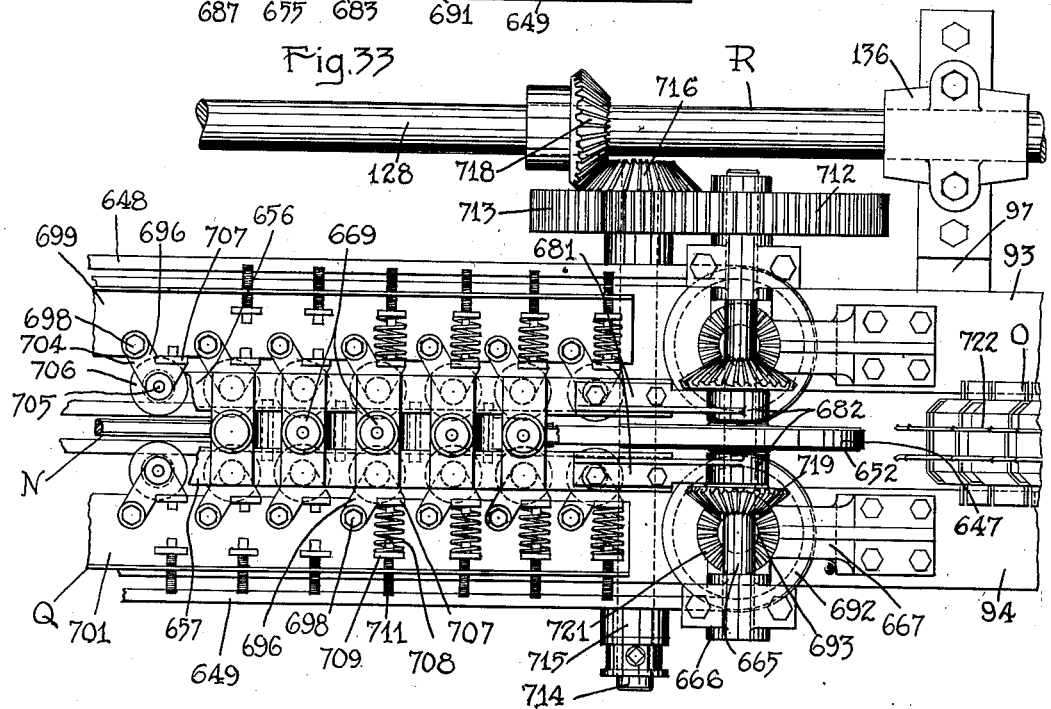

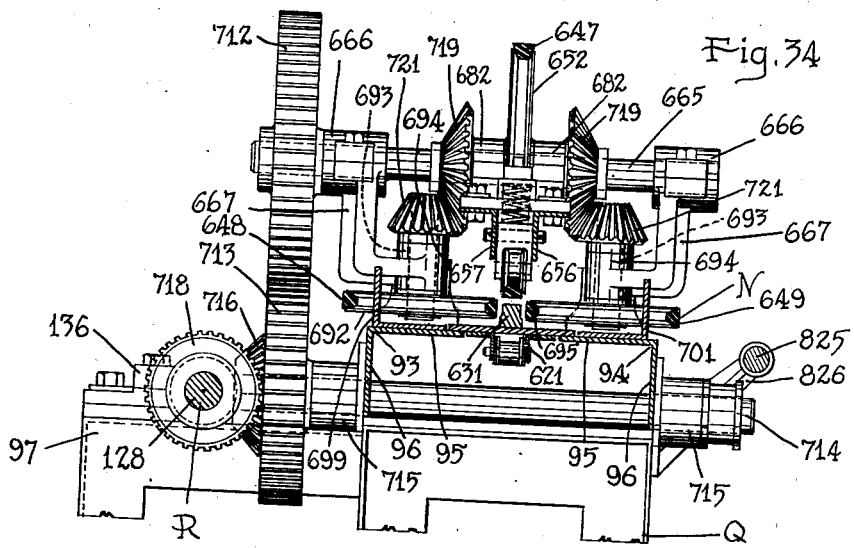
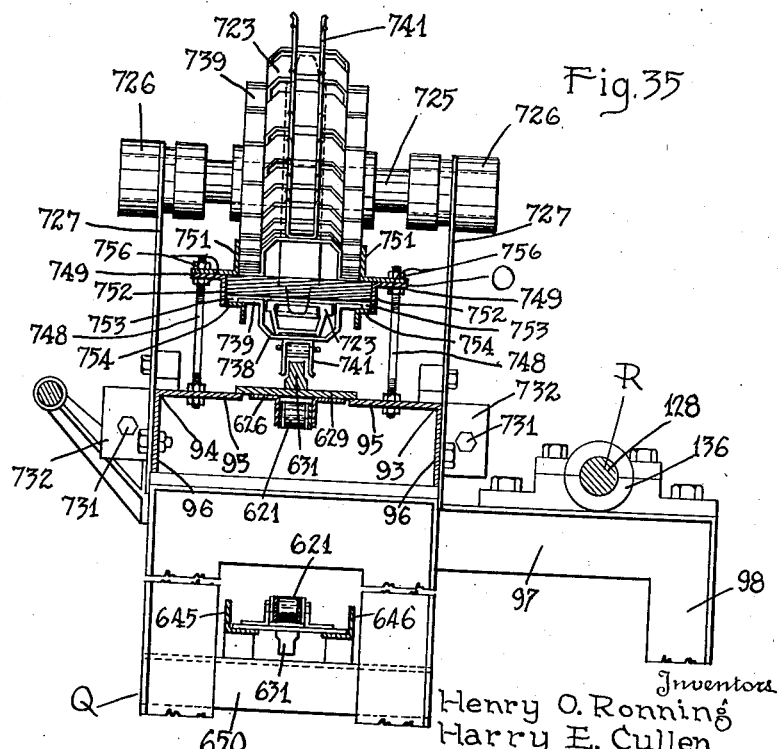

Sept. 19, 1939.                H. O. RONNING ET AL                2,173,313
                      MACHINE FOR MAKING GARMENT HANGERS
                         Filed March 28, 1938        26 Sheets-Sheet 23

Fig. 40

Inventors
Henry O. Ronning
Harry E. Cullen
Edwin G. Monson and
Nels H. Sandberg
By Caswell & Lagaard

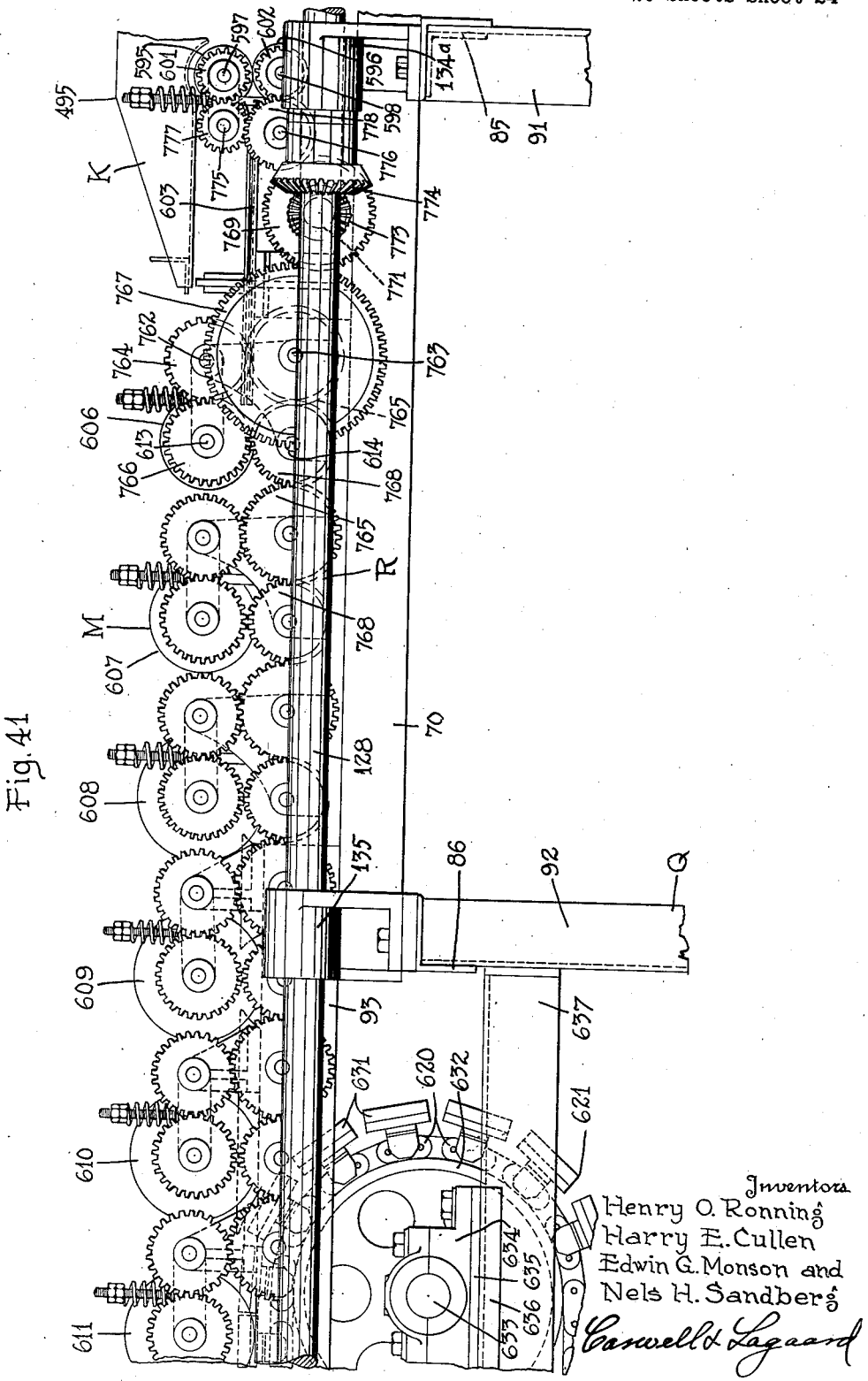

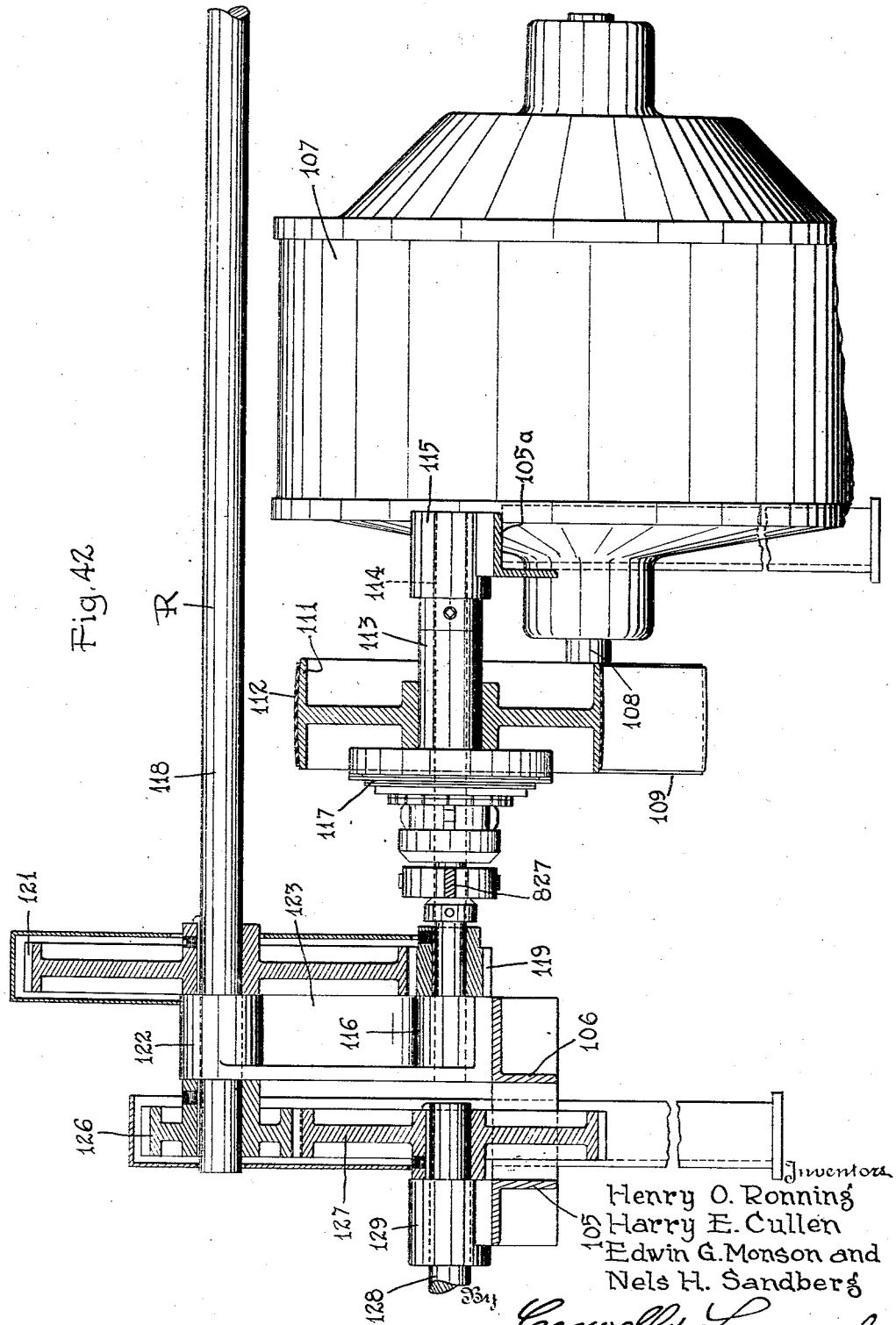

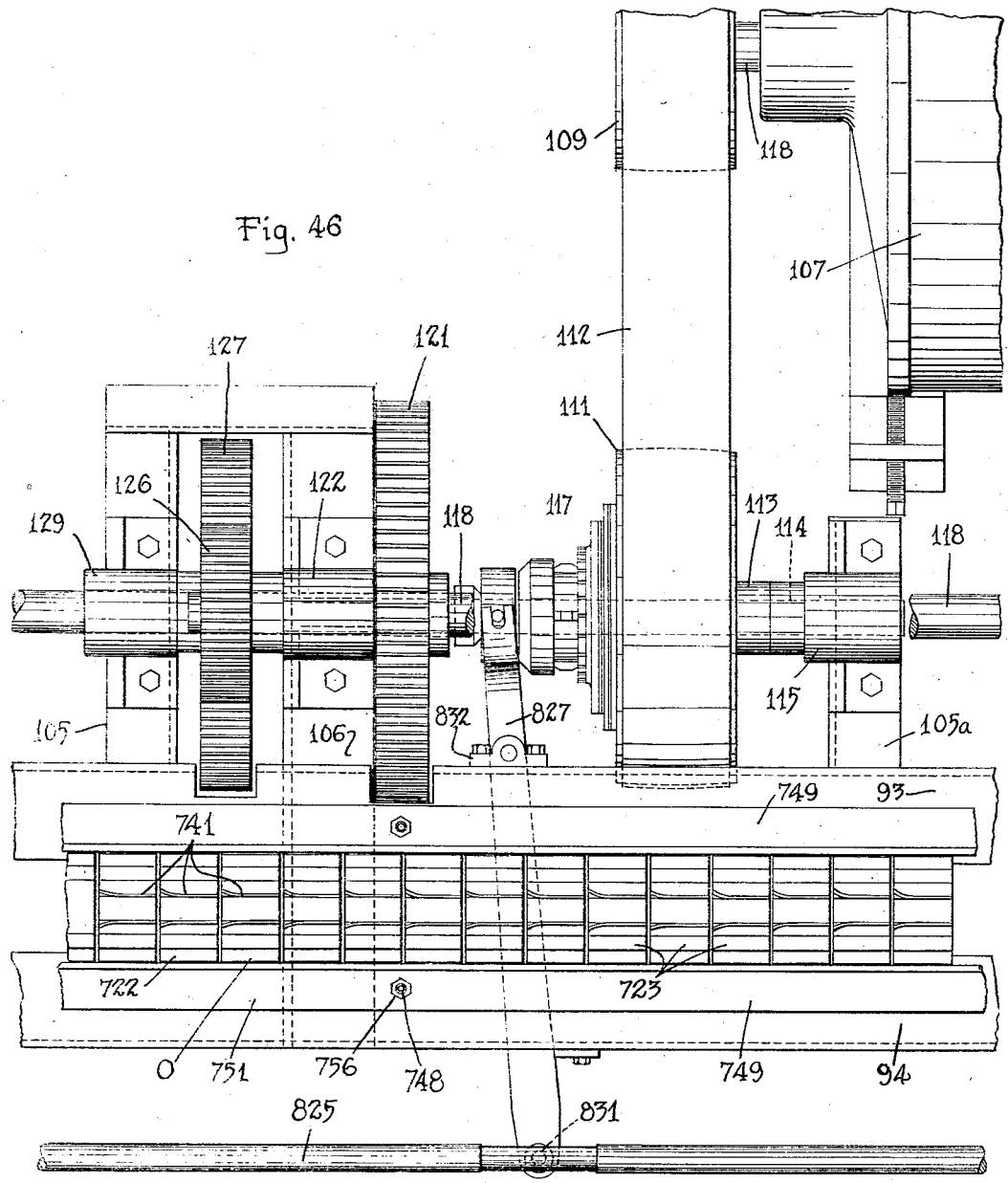

Patented Sept. 19, 1939

2,173,313

UNITED STATES PATENT OFFICE 2,173,313

MACHINE FOR MAKING GARMENT HANGERS

Henry O. Ronning, Harry E. Cullen, Edwin G. Monson, and Nels H. Sandberg, Minneapolis, Minn., assignors to Waldorf Paper Products Company, St. Paul, Minn., a corporation of Minnesota Application March 28, 1938, Serial No. 198,482

19 Claims. (Cl. 93—1)

Our invention relates to machines for making garment hangers and particularly to a machine for making paper garment hangers.

An object of the invention resides in providing a machine by means of which garment hangers such as shown in the application for patent of Reynolds Guyer, and Richard B. Lewis, Jr., Serial No. 112,963, filed November 27, 1936, may be made.

Another object of the invention resides in providing a machine in which the garment hangers are automatically made from strips of paper and wood bars applied thereto.

A still further object of the invention resides in providing a machine by means of which the method disclosed in said application for patent of Reynolds Guyer aforesaid may be carried out.

Another object of the invention resides in providing a machine in which the main strip of paper is successively folded longitudinally to form a flattened tubular structure.

A still further object of the invention resides in providing a machine in which the reinforcing bar and reinforcing insert are inserted into the tubular structure prior to completion thereof.

Another object of the invention resides in providing a machine in which the flattened tubular structure is subsequently to its formation separated in sections, each section being used to form a garment hanger.

A still further object of the invention resides in providing a machine in which the sections of the tubular structure are folded transversely to form the frame members of the garment hanger.

An object of the invention resides in providing a machine in which the frame members of the garment hangers are brought into overlying position.

Another object of the invention resides in providing a machine in which the folded garment hangers are formed channel-shaped in cross section.

Other objects of the invention reside in the combination and arrangement of the various parts of the machine, in the various elements and mechanisms of the machine individually and in combination and in the details of construction hereinafter described.

In the drawings:

Fig. 1 is a longitudinal elevational view of the reel of the invention.

Fig. 2 is a longitudinal elevational view of the printing press of the invention.

Fig. 3 is a longitudinal elevational view of the scoring device, gluing device, reinforcing bar rack and reinforcing bar feeding mechanism of the invention.

Fig. 4 is a longitudinal elevational view of the strip flanging mechanism, the reinforcing insert cutting and applying device and the doubling over device.

Fig. 5 is a longitudinal elevational view of the end forming device.

Fig. 7 is a longitudinal elevational view of the channeling device.

Fig. 8 is a longitudinal elevational view of the head end of the glue setting conveyor.

Fig. 9 is a longitudinal elevational view of the tail end of the glue setting conveyor.

Fig. 10 is a longitudinal elevational view of the head end of the glue drying conveyor.

Fig. 11 is a longitudinal elevational view of the tail end of the glue drying conveyor.

Fig. 12 is a longitudinal elevational view of the ejector.

Fig. 13 is a plan view of the structure shown in Fig. 1.

Fig. 14 is an elevational sectional view taken on line 14—14 of Fig. 2.

Fig. 15 is a plan view of the scoring device, gluing device, reinforcing bar feed mechanism, reinforcing bar rack and a portion of the strip flanging mechanism.

Fig. 16 is an elevational sectional view taken on line 16—16 of Fig. 15.

Fig. 17 is a plan view of the structure shown in Fig. 4.

Fig. 19 is a longitudinal elevational sectional view taken on line 19—19 of Fig. 17.

Fig. 20 is a longitudinal, elevational sectional view taken on line 20—20 of Fig. 18.

Figs. 21, 22, 23 and 24 are cross sectional views of the channeling device taken on lines 21—21, 22—22, 23—23, 24—24 of Fig. 28.

Fig. 25 is a plan view of the end forming device, the folding device and kicker.

Fig. 26 is a perspective view of a portion of the reinforcing insert cutting and applying device.

Fig. 27 is a perspective view of one of the supporting brackets of the invention.

Fig. 28 is a longitudinal sectional view taken on line 28—28 of Fig. 25.

Fig. 30 is a cross sectional view taken on line 30—30 of Fig. 25.

Fig. 31 is a plan view of the structure shown in Fig. 7.

Fig. 32 is a plan view of the structure shown in Fig. 8.

Fig. 33 is a plan view of the structure shown in Fig. 9.

Fig. 34 is a cross sectional view taken on line 34—34 of Fig. 9.

Fig. 35 is a cross sectional view taken on line 35—35 of Fig. 10.

Fig. 36 is a perspective view of a portion of the glue setting conveyor.

Fig. 37 is a perspective view of a portion of the glue drying conveyor.

Fig. 38 is a perspective view of another portion of the glue drying conveyor.

Fig. 39 is a perspective view of a part of the structure shown in Fig. 38.

Fig. 40 is a plan view of the structure shown in Figs. 11 and 12.

Fig. 41 is a longitudinal sectional view taken on line 41—41 of Fig. 31.

Fig. 42 is a longitudinal elevational view of a portion of the transmission showing parts thereof in section.

Fig. 43 is a perspective view of a garment hanger constructed upon a machine embodying our invention.

Fig. 44 is a cross sectional view taken on line 44—44 of Fig. 43.

Fig. 45 is a developed view of a portion of the blank from which the garment hanger, shown in Fig. 43, is constructed.

Fig. 46 is a plan view of the transmission of the invention.

Figure 29:
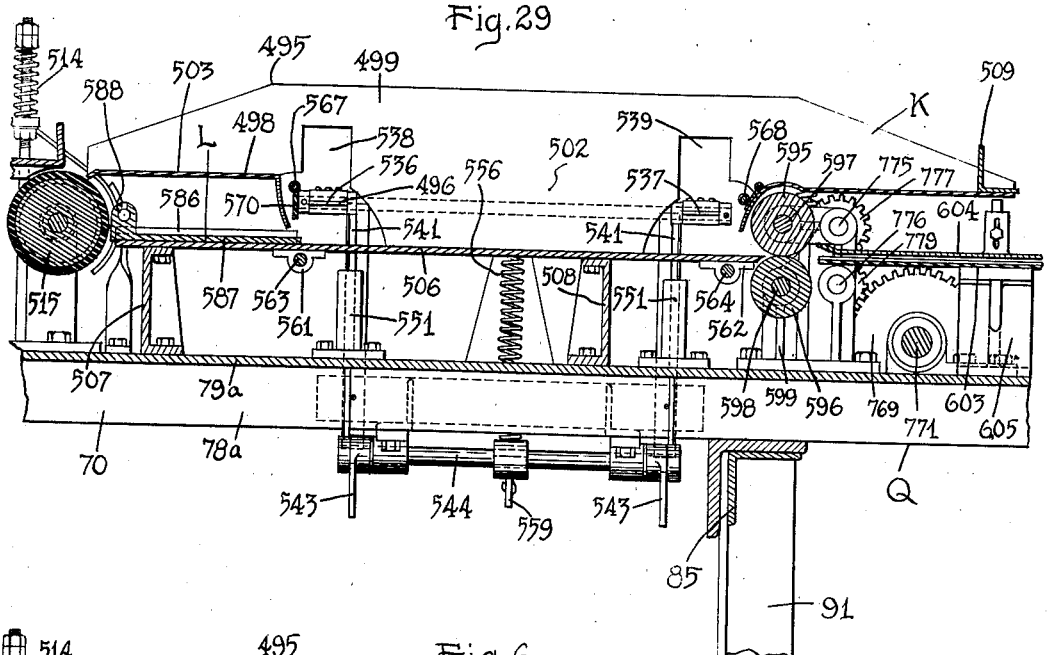
Fig. 29 is a longitudinal sectional view taken on line 29—29 of Fig. 25.

Our invention comprises a reel A on which a roll of paper, indicated at 50, is mounted. A strip 51 of paper from the roll 50 is fed to a printing press B where the strip is printed as desired. The strip of paper, on leaving the printing press, passes through a scoring device C which scores the strip both longitudinally and transversely so that the same may be readily flanged and subsequently doubled over to form a tubular structure from which the garment hanger is constructed. A gluing device D, situated in proximity to the scoring device, applies glue or any other suitable adhesive to the inner surface of the strip of paper 51. Situated above the traveling strip of paper is a reinforcing bar rack E from which reinforcing bars are fed one at a time to the traveling strip of paper by means of a reinforcing bar feed mechanism F. After these bars have been properly applied to the glued strip, the strip is formed with flanges by means of a strip flanging mechanism G. Following the strip flanging mechanism is a device for cutting and applying reinforcing inserts to the glued strip, indicated by the reference character H. After the inserts have been applied a doubling over device I doubles the flanges back upon the intermediate portion of the strip and upon the reinforcing bar and insert forming a tubular structure from the strip in which the reinforcing bar and insert are enveloped. The machine includes an end forming device J which cuts off the tubular strip into sections from which the garment hangers are constructed and also forms the ends of the same in proper shape. The sections of the tubular structure are folded by a folding device K which folds the sections along the transverse scores formed by the scoring device C and brings the side frame members of the hanger into overlying position with respect to the cross frame member of the hanger. A kicker L moves the folded garment hanger to a channeling device M, where the folded garment hanger is formed into a form of channel-shaped cross section. To cause the glue to set and to attach the various parts of the garment hanger together, the folded garment hangers pass along a glue setting conveyor N. On leaving the glue setting conveyor N the garment hangers pass along a glue drying conveyor O and are finally ejected from the machine by an ejector P. All of the various parts of the machine, except the reel A and printing press B, are mounted on a frame, indicated in its entirety by the reference character Q. The various parts of the invention are operated by a transmission R also carried by this frame.

The various parts of our invention will now be described in detail.

To more clearly understand the nature of the invention, one of the garment hangers formed by our improved machine has been shown in Figs. 43, 44 and 45. This garment hanger comprises a frame 52 which consists of a cross frame member 53 and two side frame members 54 and 55. The frame members 54 and 55 are hingedly connected to the frame member 53 and are adapted to be folded to overlie said cross member when in collapsed position, or to be extended obliquely therefrom, as shown in Fig. 43 when erected. These frame members have attached to them a hook 56. The frame 52 is constructed from a tubular structure which is formed from the strip of paper 51 which is scored longitudinally along lines 49 to provide flanges 48. These flanges are doubled back upon themselves and glued together. Within the tubular structure, forming the frame member 53, is a reinforcing bar 57 of wood or some other suitable material. At the ends of the side frame members 54 and 55 are reinforcing inserts 58 which are formed in the construction of the hangers, prior to the cutting of the tubular structure into sections. A single insert is inserted into the tubular structure as the same is being formed and subsequently sheared off together with the tubular structure to form separate inserts at the adjoining ends of the two adjacent garment hangers. The frame 52 of the garment hanger is first formed flat and is thereafter folded to bring the side frame members into overlying position with respect to the cross frame member. The folded structure is then channeled and maintained in such form while the glue is setting and drying after which the hanger is completed and ready for use.

The frame Q, of the invention, supports the major portion of the machine and consists of a longitudinally extending channel-shaped frame member 76 which is constructed with depending flanges 77 and 78 and a web 79 arranged uppermost. The frame member 76 extends partially throughout the length of the machine and is depressed at the head end thereof. Below this frame member and attached thereto is a second longitudinal frame member 70 of the same shape and dimensions, which extend throughout a portion of the length of the machine. This frame member is constructed with a web 79² and flanges 77² and 78² depending therefrom. Attached to the undersides of the longitudinal frame members 70 and 76, are a number of cross frame members 81, 82, 83, 85 and 86 which are supported on legs 87, 88, 89, 91 and 92. Another cross frame member 84 is directly attached to the frame members 76 and 70 but is unsupported on legs. Attached to the web 79$a$ of the longitudinal frame member 70, at its tail end, are two angle frame members 93 and 94 which are disposed with their flanges 95 uppermost and the flanges 96 depending therefrom. These angle frame members are spaced, as best shown in Figs. 32 and 34. The angle frame members 93 and 94 are supported on cross frame members 97 and legs 98 and 100 which function in the same manner as the legs and cross frame members, previously referred to, and which are distributed along the said angle frame members throughout the extend thereof. At the tail end of the frame members 93 and 94, are provided legs 99 and 101 of which the legs 99 support certain portions of the glue drying conveyor O as will be presently more fully described. Attached to the frame members 93 and 94, at the tail ends of the same, are two extensions 102 and 103 which are secured thereto by means of bolts 104. These extensions support the ejector P as will be presently more fully described. Attached to the under side of the two longitudinal angle frame members 93 and 94, at the locality of the glue drying conveyor, (Fig. 42) are three transverse frame members 105, 105a and 106 which extend outwardly beyond the machine proper and which support portions of the transmission R of the invention.

The transmission R, of the invention, as best shown in Figs. 42 and 46 includes an electric motor 107 which rests on the floor on which the machine is installed. This motor is provided with an armature shaft 108, which carries a driving pulley 109. Driving pulley 109 is belted to a pulley 111 by means of a belt 112. Pulley 111 is mounted on a sleeve 113 which is rotatably mounted on a shaft 114. Shaft 114 is journaled in two bearings 115 and 116 of which the bearing 116 is attached to the transverse frame member 106 of the frame Q and of which bearing 115 is attached to frame member 105a. Mounted on the shaft 114 is a clutch 117 by means of which the pulley 111 may be coupled to the shaft 114. Adjacent the bearing 116 is mounted on the shaft 114 a pinion 119 which meshes with a gear 121. The gear 121 is keyed to a longitudinally extending line shaft 118 which extends back to the tail end of the machine and which drives the glue drying conveyor O. The shaft 118 is journaled in a bearing 122 which forms part of a bracket 123 issuing from the bearing 116. The shaft 118 is further journaled in bearings 124 and 125, secured to the longitudinal frame member 93. The shaft 118 extends beyond the bearing 122 and has secured to it a spur pinion 126. This pinion meshes with a spur gear 127, fast on a line shaft 128, which extends longitudinally along the machine toward the head end thereof. Shaft 128 is journaled in a bearing 129 attached to the transverse frame member 105 of frame Q. This shaft is further journaled in bearings 131, 132, 133, 134, 135 and 136 which are secured to the cross frame members 81, 82, 83, 84, 85, 86 and 97.

The reel A is shown in detail in Figs. 1 and 13 and comprises a standard 59 which consists of an A-frame 61 mounted on a base 62. Issuing outwardly from the upper end of the A-frame 61 is a stud 63 on which is rotatably mounted the reel proper which is indicated by the reference numeral 64. This reel comprises a core 65 which is rotatably mounted on the stud 63 and which is held from endwise movement thereon by means not shown in the drawings. The reel includes two spiders 66 and 67, the said spider 66 being attached to the core 65. The spider 67 is constructed with a hub 68 which slides on the core 65 and which may be locked in any position thereon by means of a set screw 69. The roll of paper 50 is mounted upon the core 65 and the strip of paper 51 is reeled off from the same.

The strip of paper 51, upon leaving the reel A, enters the printing press B, which is shown in Figs. 2 and 14. This printing press comprises a frame 71 which includes a base 72 and four uprights 73 and 74 attached thereto and which are braced by suitable cross braces 75. Attached to the uprights 74 are bearings 137 which journal a shaft 138. This shaft carries a drum 139 which supports a type plate 141. Below the drum 139 is provided a cylindrical platen 142 which is carried by a shaft 143 journaled in bearings 144 slidably mounted in a bearing frame 148 attached to the uprights 74. This platen may be moved toward and from the type plate 141 and drum 139 by means of a screw 145 and a worm wheel 146 connected therewith which is driven by means of a shaft 147 carried by the bearing frame 148.

The strip of paper 51, on leaving the reel A, passes between tension rolls 149 and 151 which are carried by brackets 152 attached to the uprights 73. The strip of paper, on leaving the tensioning rolls 149 and 151, passes between two feed rolls 153 and 154. The roll 153 is journaled in bearings 155 formed in standards 156 secured to the base 72 of frame 71. The roll 152 is journaled in adjustable bearings 157 mounted in the standards 156 which bearings may be adjusted by screws 158, similar to the bearings 144. The strip of paper 51, on leaving the said rolls 153 and 154, passes about the platen 142 and between it and the drum 139, being carried toward the head end of the machine and brought upwardly about an idler roll 159, journaled in bracket 161, attached to the uprights 73. The strip, thereafter, passes upwardly and about another idler roll 162, journaled in bearings 163 which are secured to the upper ends of the uprights 73. From the idler roll 162 the strip 51 passes downwardly and into the scoring device C as will be presently more fully described.

The shaft 138 carrying the drum 139 serves as a countershaft and is driven in the following manner: Attached to the end of this shaft is a beveled gear 164 which meshes with another bevel gear 165 fast on a shaft 166. Shaft 166 is journaled in a bearing 167 secured to a bracket 168 attached to one of the uprights 74. This shaft is in axial alignment with the main line shaft 128 and is directly coupled thereto. Shaft 138 carries a spur gear 169 which meshes with another spur gear 171 fast on shaft 143. This spur gear meshes with a spur pinion 172 carried by shaft 173 which is journaled in bearings 174 formed on the standards 156. Spur pinion 172 meshes with a spur gear 175 which travels with the feed roll 153 and drives the same.

The type plate 141 is inked in the following manner: Attached to the upright 73 is a cross frame member 176, and attached to the upright 74 is a cross frame member 177. Two side plates 178 and 179 are supported on these two cross frame members and are braced with reference thereto by means of braces 181. Attached to the uppermost portions of the plates 178 and 179 and near the head end of the machine is an ink fountain 182 which rotatably supports an ink roll 183 projecting outwardly therefrom. This ink roll is rotated by means of a crank 184 and a link 185 connected thereto. Between the crank 184 and the roll 183 is a suitable ratchet mechanism so that the roll 183 is given a step-by-step movement. The link 185 is connected to a crank pin 187, formed on the end of a transverse shaft 188, which is journaled in bearings formed in the two plates 178 and 179. Journaled between the two plates 178 and 179 is an ink roll 189 which carries ink to a succession of rolls 191, 192 and 193. These rolls are all journaled in bearings formed in the plates 178 and 179 and are all geared together and to the gear 169 by means of gears 194, 195, 196 and 197. An ink transfer roll 198 is movable between the ink roll 183 and ink roll 189. This transfer roll is journaled in bearings 199 which are attached to a transversely extending rod 201. Rod 201 is attached to the lower ends of two levers 202 which are pivoted to the plates 178 and 179 by means of studs 203. A cam follower 204, on the end of one of the levers 202, is adapted to engage a cam 205 on the shaft 188. By means of this construction the transfer ink roll 198 is alternately brought into engagement with the rolls 189 and 183 to periodically feed ink to the same. Shaft 178 is driven through a gear 180 thereon which meshes with a gear 190 attached to gear 194. It will readily be comprehended that the type plate 141 is inked as the same passes the ink roll 193 and the impression transferred to the strip of paper 51 as it passes over the platen 142 and between it and the type plate.

The scoring device C is best shown in Figs. 3, 15 and 16. At the head end of the longitudinal frame member 76 are provided two brackets 206 and 207. These brackets have upright portions 208 provided at their lower ends with bearings 209. The two brackets 206 and 207 are tied together with two angle bars 211 and 212 which are bolted thereto to brace the said brackets. Journaled in the bearings 209 is a transverse shaft 213. At the upper ends of the upright portions 208 are provided guides 214 which slidably support bearings 215 movable toward the bearings 209. These bearings journal a second transverse shaft 216 disposed directly above the shaft 213 and adapted to be moved toward the same. The guides 214 are provided with caps 217, which contain compression coil springs, not shown, which urge the two bearings 215 toward the bearings 209.

Attached to the shaft 213, between the bearings 209, is a drum 218 which carries a cylindrical die plate 219. The shaft 216 has similarly attached to it a drum 221 which carries a complemental cylindrical die plate 222. The surface of the die plate 219 is constructed with grooves 223 and the surface of the die plate 222 is constructed with ridges 224 which project outwardly therefrom and are adapted to register with the grooves 223. These grooves and ridges are so arranged so as to form the various scores in the paper as the strip passes between the same. The shaft 216 being urged toward the shaft 213 yieldingly forces the paper into the grooves 223 and forms the scores.

The strip of paper 51, on leaving the idler roll 162, passes to a feed device 225, best shown in Fig. 16. This device consists of two plates 226 and 227 held in spaced relation and bolted to supporting brackets 228 secured to the angle cross bar 212. The feed device 225 carries the strip of paper 51 into tangency with the scoring surfaces of the two cylindrical die plates 219 and 222.

The two shafts 213 and 216 are positively driven with reference to one another as shown in Fig. 15 in the following manner: Attached to the shaft 213 is a spur gear 229 which meshes with another spur gear 231 fast on the shaft 216. These spur gears have the same pitched diameter which is equal to the diameters of the two cylindrical die plates 219 and 222. The shaft 213 is in the same horizontal plane as the line shaft 128 and terminates short of said shaft. The end of shaft 213 has secured to it a bevel gear 232 which meshes with a corresponding bevel gear 203 fast on shaft 128.

The gluing device D is shown in the same figures as the scoring device and will now be described in detail. Attached to the longitudinal frame member 76, in close proximity to the transverse angle bar 211, are two uprights 234 which support a transverse plate 235. The glue pot, of the invention, is indicated by the reference numeral 236 and is attached to and carried by the plate 235. The glue pot 236 includes a laterally extending compartment 237 which is rectangular in cross section, as best shown in Fig. 16. Within the laterally extending compartment 237 of glue pot 236 are two end frames 238 which have projecting portions extending outwardly of said compartment. These end frames rotatably support three shafts 255, 256 and 257. These shafts support three glue rollers 239, 241 and 242. The glue roller 239 is disposed within the compartment 237 of the glue pot and picks up the glue and transfers it to glue roller 241, which is located exteriorly of the said compartment. This roller in turn transfers the glue to the roller 242, the lower surface of which is situated below the under side of the plate 235.

The strip of paper 51 is led from the scoring device C to the gluing device D by means of a guide 243, similar to the guide 225. This guide is attached to two arms 244 which are secured to a transverse shaft 245 mounted for oscillation in bearings formed in the two brackets 206. The ends of these arms are secured to a cross bar 246 which is adjustable relative to the plate 235 by means of two position limiting screws 247, which are threaded in said bar and engage the under surface of the plate 235. Attached to the end of the shaft 245 (Fig. 3) is a bent lever 309 which has two arms 311 and 312. A tension coil spring 313 is secured at one end to the arm 311 and at its other end to a lug 314 attached to the cross frame member 81. This spring urges the arms 244 upwardly and the guide 243 toward the underside of the glue roller 242. The arm 311 carries, at its outer end, a roller 315. Pivoted to the upright portion 208 of bracket 206 is a hand lever 316. This hand lever has a cam 317 at the end of the same which is adapted to engage the roller 315 and to move the same upwardly. When the lever 316 is moved in a counter-clockwise direction, as viewed in Fig. 3, the roller rides along the cam 317 and shaft 245 is moved in a clockwise direction. This swings arms 244 away from the glue roller and moves the guide 243 downwardly to prevent the paper from engaging the glue roller. This device is particularly useful when the paper strip is being fed into the machine and when it is desired that the strip be not glued. After the paper reaches the strip flanging mechanism G the lever 316 is moved to free the arm 311 and the gluing operation commences. By means of this construction the pressure of the paper against the under side of the glue roller 242 may be controlled. The glue roller 242 is formed with a number of depressions in the surface thereof which provide three projecting bands 248 which apply the glue to the strip 51 along the marginal edges and along the center of the same. This is for the purpose of leaving the intervening portions of the strip free from glue to permit of turning of the strip by means of the strip flanging mechanism to be presently described.

The glue rollers 239, 241 and 242 are driven in the following manner. Journaled in two bearings 249, formed on the upright portions 208 of brackets 206, is a shaft 251. This shaft carries, on one end, a spur gear 252 which meshes with the gear 231, driving the drum 221 of the scoring device C. The shaft 251 is driven by the gear 252 through a free-wheeling device diagrammatically indicated at 264. The other end of this shaft has attached to it a spur gear 253 which meshes with a spur gear 254, carried by the shaft 257 supporting the glue roller 242. Shaft 257 also carries a spur gear 258 which meshes with a spur gear 259, rotatably mounted on a stud 261, attached to one of the end frames 238. Gear 259 meshes with a gear 262, secured to the end of shaft 256. This gear, in turn, meshes with another spur gear 263, fast on the shaft 255.

Attached to the end of the shaft 251 is a pulley 265. A belt 266 passes over this pulley and over another pulley 267, mounted on the low speed shaft 268 of a gear reduction unit 269. The gear reduction unit 269 is driven by means of an electric motor 271. When the machine is in operation the motor 271 keeps the free-wheeling device 264 in operation and the gear 252 meshing with the gear 231 times the movement of the shaft 251 so that the gluing rollers 239, 241 and 242 travel at the proper speed. In the event that the machine is shut down for any purpose, motor 271 continues to operate and the free-wheeling device 261 free-wheels or coasts, permitting the gear 252 to stop with the driving mechanism of the entire machine and allowing the shaft 251 to continue to rotate. In this manner the glue rollers operate continuously regardless of whether or not the machine is running so that gumming of glue is prevented. To maintain the desired thickness of the coating of glue, two scrapers 272 and 273 are used which operate in the ordinary manner and control the thickness of the layer of glue on the two glue rollers 241 and 242. These scrapers are supported from the end frames 238. The scraper 272 also scrapes the glue out of the recessed portions of the glue roller 242 to prevent coating of the intermediate areas of the strip of paper.

The reinforcing bars 57, used in conjunction with the garment hanger, made by the instant invention, are carried in the reinforcing bar rack E. This rack is constructed and supported as follows: Attached to the longitudinal frame member 76, adjacent the gluing device D, are two uprights 274. These uprights are of substantially the same height as the two uprights 234 and both uprights 234 and 274 and plate 235 support a table 275, the under surface of which is substantially tangent to the lower portion of the glue roller 242 so that the strip of paper 51, upon leaving the gluing device D, passes underneath the plate 235 and along the under surface of the table 275.

The rack E comprises four uprights 276, 277, 278 and 279 which are T-shaped in cross section and which are arranged with their vertical legs innermost. The uprights 276, and 277 are spaced from one another and the two uprights 278 and 279 are spaced from one another distances apart substantially equal to the width of the reinforcing bars 57 and serve as guides for supporting the bars in upright position, one upon the other. Lugs 281 extending outwardly from the lower ends of uprights 276, 277, 278 and 279 are bolted to the table 275. The two uprights 276 and 277 are held in proper spaced position by means of U-shaped brackets 282 which are attached to a vertical end guide member 283. A similar end guide member 284 is attached to the uprights 278 and 279 and also holds these uprights in proper spaced relation. Both the end guide members 283 and 284 are spaced from one another a distance equal to the length of the reinforcing bars 57 and are raised above the table 275 a distance slightly greater than the thickness of the reinforcing bars.

The reinforcing bar feed mechanism F consists of a slide 285 which is of the same cross section as that of the reinforcing bars. This slide is slidably mounted for reciprocating movement longitudinally of the frame member 76 in two guides 286 carried by the table 275. The tail end of the slide 285 has attached to it a block 287 to which is pivoted two links 288. Links 288 are in turn pivoted to corresponding crank arms 289 which are attached to a shaft 291. Shaft 291 is journaled in bearings 292 secured to the longitudinal frame member 76. The shaft 291 has attached to one end of it a depending crank arm 293 (Fig. 3) which is, in turn, pivoted to a link 294. Link 294 is supported at its other end by means of an arm 295 pivoted thereto, which arm is pivoted at its other end through a pivot 296 to one of the brackets 206 of the scoring device C. The end of the link 294 carries a roller 297 which is adapted to engage a cam 298, mounted on the shaft 213. A flanged hub 299, keyed to the shaft 213, is provided with a number of arcuate slots 301. Bolts 312 extend through these slots and are screwed into the cam 298 and serve to adjustably support the cam 298 on shaft 213. The roller 297 is held in contact with the cam 298 by means of a tension coil spring 303 which is secured to a lug 304 on the link 294 and another lug 305 on the transverse frame member 81. The cam 298 is constructed with a cylindrical surface 306. The said cam is further constructed with an inwardly spiralling cam surface 307 and an outwardly spiralling cam surface 308. When the roller 297 travels along the cam surface 306 the slide 285 is held retracted and the lowermost of the reinforcing bars 57, carried by the rack E, rests upon the table 275. As the roller 297 travels along the cam surface 307, roller 297 moves radially inwardly, shaft 291 is oscillated in a clockwise direction, and slide 285 is reciprocated toward the right, as viewed in Figs. 3 and 16. This ejects the lowermost reinforcing bar from the rack E where the same is inserted upon the strip of paper 51 as it emerges from the end of the table 275.

The strip flange mechanism G follows the reinforcing bar rack E, the beginning of it being shown in Figs. 3 and 16 and the entire structure, being shown in Figs. 4, 15, 17 and 27. This device consists of a trough 318 which extends from within close proximity to the end of the table 275 up to the reinforcing insert cutting and applying device H. Near the reinforcing bar rack E the said trough is flat and at the other end the same is U-shaped in cross section. Intermediate the ends of the trough the same is gradually turned up from the one section to the other so as the strip follows along this trough the same is gradually changed from a flat form to a channel-shaped form. The trough 318 is supported upon a number of standards 319 which are attached to the longitudinal frame member 76. One of these standards is shown in detail in Fig. 27. This standard has a shelf 321 extending outwardly therefrom upon which the trough 318 rests and to which it is attached. The standard 319 also has an arm 322 overlying the trough 318 which has attached to it a shoe 323. This shoe carries a light leaf spring 324 which is disposed above the bottom of the trough 318 and is yieldingly urged toward the bottom of said trough to hold the paper strip 51 and the reinforcing bar 57 lying upon the same in engagement therewith.

Intermediate the standards 319 are provided presser roll units 325, which feed the strip along the machine. Inasmuch as these units are identical in construction, only one of these units will be described in detail, which is best shown in Fig. 4. Attached to the longitudinal frame member 76 are end plates 326. These plates have three bearings 327, 328 and 329 which journal three shafts 331, 332 and 333. Pivoted on the shaft 333, between the bearings 329 is an arm 334 which has an elongated boss 335 journaling a shaft 336. The shaft 331 carries a cylindrical roll 337 which extends through an opening 338 in the trough 318, best shown in Fig. 27. The shaft 326 carries a grooved roll 339 which is situated above the roll 337. The arm 334 is formed with a web 341 through which a threaded rod 432 extends. This rod extends loosely through a hole in the web 79 of longitudinal frame member 76 and is provided on its underside with a nut 343. The upper end of the rod 342 has mounted on it a compression coil spring 344 which is set against the web 341 and against a nut 345 screwed upon the rod 342. A lock nut 346 holds this nut in position. By means of this construction, the arm 334 is urged downwardly and the roller 339 urged toward the roller 337. It will be noted from Fig. 16 that the reinforcing bars ejected from the rack E reach the first pair of rollers 337 and 339. Also the strip of paper 51 passes between these rollers. These rollers being positively driven feed the strip and bar and press the same together. The groove in the roll 339 holds the bar in proper position. As the strip and bar progress through the strip flanging mechanism G, the marginal portion of the strip is turned up so that the strip is channel-shaped when entering the reinforcing insert cutting and applying device H.

The various shafts 331, 332, 333 and 336 are driven in the following manner as clearly shown in Fig. 4. Attached to the shafts 331 are spur gears 347. Attached to the shafts 332 are spur gears 348. All of these gears mesh with one another so that the successive shafts 331 and 332 are all driven one from the other. Attached to the shafts 333 are gears 349 which mesh with other gears 351 on the shafts 336 and also with the gears 348. The gears 351 do not mesh with the gears 347 so that the shafts 336 can be moved toward and from the shafts 331 to accommodate variations in thickness of the reinforcing bars and the paper stock. By means of the individual drives for each of the shafts 336, positive driving action is had at all adjustments of the arms 334. The method of driving the various shafts 331 and 332 will be subsequently described in detail.

After the strip of paper has been formed into channel-shape, the reinforcing insert cutting and applying device H applies an insert to the strip at the locality where the strip is cut into the individual sections from which the garment hangers are constructed. This device is best shown in Figs. 4, 17, 18, 19, 20 and 26. This device is supported on a frame work 352 which includes four standards 353 and 354. These standards have attached to the lower ends thereof angle legs 355 which are attached to the web 79 of the longitudinal frame member 76. The upper ends of the standards 353 and 354 are secured together by means of a header 356 which consists of two longitudinal vertical plates 357 and 358 and two transverse plates 361 and 362. The longitudinal plates 357 and 358 overlie the uprights 353 and 354 and are bolted thereto.

The strip of paper from which the inserts are formed is cut off by a shearing mechanism 360, best shown in Fig. 17. Formed between the plates 361 and 362 are two guides 363 and 364 which slidably support a cross head 365. This cross head carries a cutting blade 366 which cooperates with a fixed blade 367 to cut off the inserts from a continuous strip of paper. Immediately below the cross head 365 is a drum 368 which is mounted on a shaft 369. This shaft is journaled in two bearing blocks 371 which are slidably supported in suitable guides disposed between the standards 353 and 354. Compression coil springs 372, acting between the upper surfaces of the bearing blocks 371 and parts fixed relative to the header 356 urge the blocks downwardly and the drum 368 into surface contact with another drum 373. This drum is mounted on a shaft 374, which is journaled in bearings 375 attached to the flanges 77 and 78 of the longitudinal frame member 76.

The shaft 374 has attached to the end thereof a bevel gear 376 which meshes with another bevel gear 377, fast on shaft 128. A spur gear 378 mounted on the shaft 374 meshes with a similar spur gear 379, fast on shaft 369. The two drums 368 and 373 are both of the same diameter and the gears 379 and 378 are likewise of the same diameter. These gears are situated so that the same lie tangent to the strip of paper 51 leaving the strip flanging mechanism G.

In advance of the shearing mechanism 360 is situated a punching mechanism 381. This punching mechanism consists of two guides 382 which are attached to the standards 354 and slidably support a cross head 383. This construction is best shown in Fig. 26. The cross head 383 carries a punch 384 which is adapted to engage a slot 385 in a rigid die member 386 attached to the uprights 354. A chute 390 removes the punchings passing through the die member 386.

For operating the two cross heads 365 and 383 a short rock shaft 387 is employed which is journaled in two bearings 388 attached to the upper ends of two of the standards 353 and 354. This rock shaft has attached to it two arms 389 and 391 which overlie the cross heads 383 and 365. Two links 392 are pivoted to the cross head 383 and to the end of the arm 389. In a similar manner two links 393 are pivoted to the arm 391 and to the cross head 365. As the shaft 387 oscillates, the two cross heads 365 and 383 are reciprocated to procure operation of the shearing mechanism 360 and the punching mechanism 381.

The shaft 387 is operated by means of a crank arm 394 which is rigidly secured thereto and which has attached to it an adjustable link 395. This link is reciprocated by means of an eccentric 396 which is attached to shaft 374. The throw of the eccentric 396 may be varied by an adjusting device 397 which may be of any suitable construction.

Figure 18:
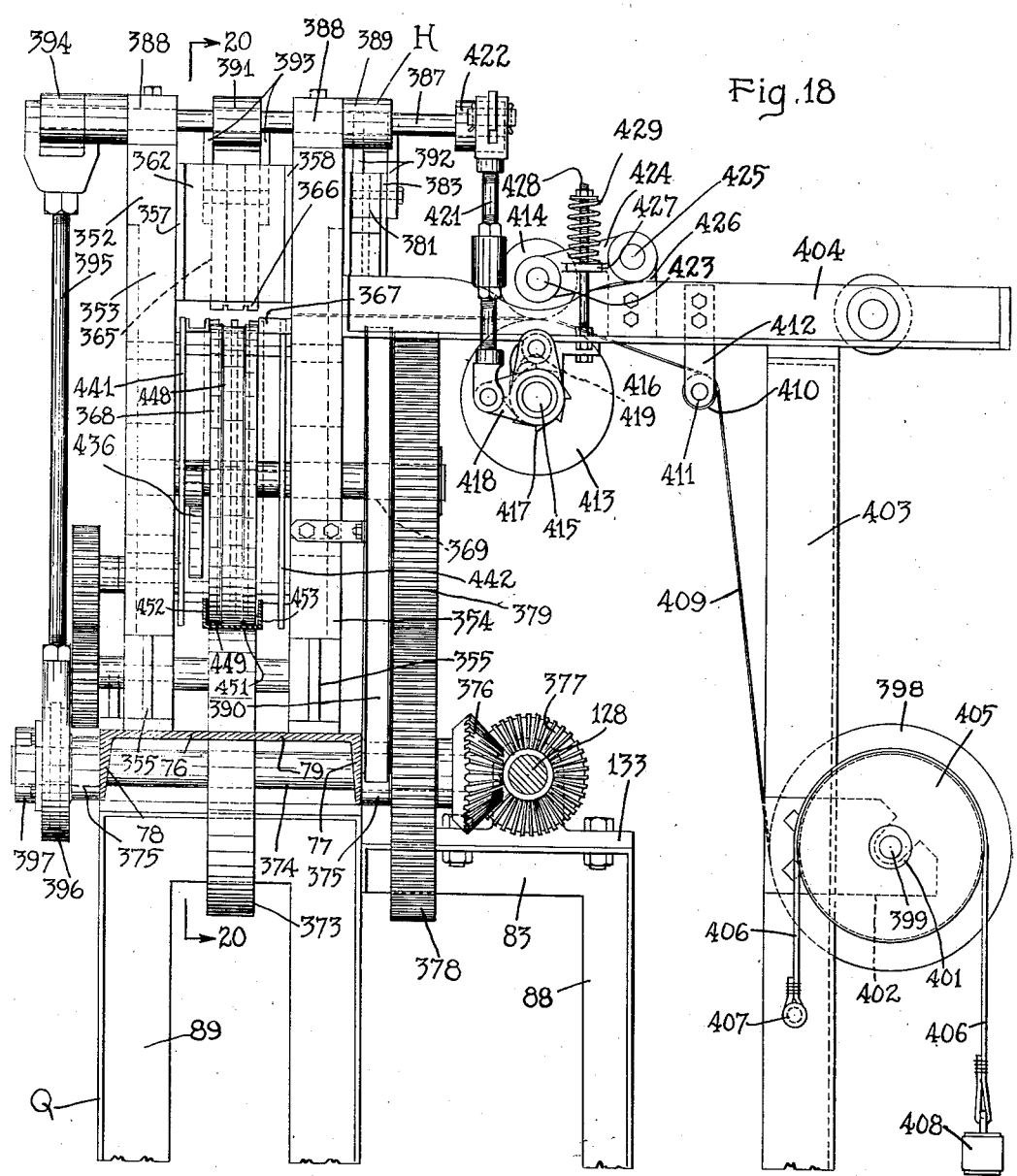
Fig. 18 is a cross sectional view taken on line 18—18 of Fig. 4.

The paper, from which the insert is constructed, comes on a roll, which has been illustrated in Fig. 18 and designated by the reference numeral 398. This roll of paper is mounted on a shaft 399 which is rotatable in bearings 401 detachably secured to two brackets 402. The brackets 402 are attached to two uprights 403, which are braced from the two standards 354 by two frame members 404. The shaft 399 is provided with a brake drum 405. A flexible brake band 406 is anchored at 407 to the two uprights 403, passes about the drum 405 and has attached to the lower end thereof adjustable weights 408 by means of which the tension on the drum may be controlled at will.

The strip of paper leaving the roll 398 is designated by the reference numeral 409 and passes over an idler roll 410 which is carried by a shaft 411 journaled in bearings 412, secured to the frame members 404. This strip passes between a feed roll 413 and a tension roll 414 contacting therewith and by means of which the same is directed past the punching mechanism 381 and the shearing mechanism 360.

The feed roll 413 is mounted on a shaft 415 which is journaled in hangers 416 secured to the frame members 404. Shaft 415 carries a ratchet wheel 417. Rotatably mounted on the shaft 415 and adjacent the ratchet wheel 415 is a bell crank 418. This bell crank carries a dog 419 which is adapted to engage the ratchet wheel 417. An adjustable link 421 is pivoted at one end to the bell crank 418 and at its other end to an arm 422 fast on the shaft 387. As this shaft is oscillated, shaft 415 is given a step-by-step movement which feeds the strip of paper 409 progressively past the dies so as to form the reinforcing inserts.

The roll 414 is mounted on a shaft 423 which is rotatably supported on two arms 424. These arms are mounted for oscillation on a shaft 425 carried by bearings 426 secured to the frame members 404. Both of the arms 424 have formed on them ears 427. Bolts 428 extend through the bearings 416 and the said ears. Compression coil springs 429 encircling these bolts bear against the heads of said bolts and the ears 427 and urge the arms downwardly to force the tension roll 414 into engagement with the feed roll 413. In this manner the feed roll operates to positively feed the strip of paper 409, as previously described.

As previously explained, the strip of paper 409 passes along the punching mechanism 381, where slots are formed transversely of the same. When the strip reaches the shearing mechanism 360, the sections are sheared off and deposited on the drum 368. Drum 368 is constructed in its periphery with a slot 431, best shown in Figs. 19 and 20. In this slot is pivoted a catch 432 provided with projecting fingers 433 which are adapted to be moved from positions outwardly of the surface of the drum to positions receded therefrom. An arm 434 connected to the catch 432 serves to swing said catch and remove the fingers from one position to the other. This arm has mounted at the end of it a cam roller 435 which is adapted to engage a stationary cam 436. Cam 436 is constructed with a spiralling surface 437 which moves the roller 435 outwardly and causes the fingers 433 to recede and with an arcuate surface 438 which maintains the fingers in such position. A compression coil spring 439 engages the catch 432 and urges the same outwardly causing the fingers 433 to project outwardly beyond the surface of the drum 368.

The cam 436 is attached to a plate 441 (Fig. 18) which lies parallel with and spaced from the drum 368. This plate is attached to the two standards 353. A similar plate 442 on the opposite side of the drum is attached to the standards 354. These plates have secured to them cross bars 443, 444 and 445. These cross bars carry two spaced retaining springs 446 which are arranged circumferentially about the periphery of the drum 368 and in close proximity thereto. A spring finger 447, secured at one end to the header 356, extends in between the two retaining springs 446 and bears against the surface of the drum 368. When one of the sections of paper, forming the insert to be applied by the device H, is severed by the shearing mechanism 360 the same is deposited upon the surface of the drum 368. As the drum rotates in the direction of the arrow in Figs. 19 and 20, finger 433, which normally projects outwardly beyond the surface of the drum, engages the section and carries it along with it between the retaining springs 446, the spring finger 447 and drum 368. The spring finger 447 moves the paper up against the finger 433 and so maintains it until the section of paper passes said finger. The retaining springs 446, at upper ends of the same, yieldingly engage the surface of the drum 368 and maintain the severed section of the strip of paper in contact with the fingers 443. As the drum 368 rotates the cam roller 435 engages cam 436, causes the fingers 433 to recede and frees the section of paper as the same reaches a position at the lowermost portion of the drum 368.

The flanged strip of paper 51, leaving the strip flanging mechanism G, passes between the drum 368 and the drum 373. The drum 368 is of a width less than the distance between the flanges of the strips so that the same clear the flanges of the strip. The drum 368 is also constructed with a groove 448 which allows the reinforcing bars, attached to the strip 51, to pass through the device H. As the section of the strip 409 is freed from the drum 368, the same comes in contact with the glued surface of the strip 51 and is deposited upon the same, leaving said drum and traveling with the strip through the remainder of the machine.

The partly fabricated strip 51, having the reinforcing bars and reinforcing inserts applied thereto, upon leaving the mechanism H, passes through the doubling over device I. This device is best shown in Figs. 4, 5, 17, 18, 21, 22, 23, 24 and 25. This device includes a trough 449 which forms a continuation of the trough 318 and which is U-shaped at the beginning, as shown in Fig. 18, and which progressively varies in cross section, as shown in Figs. 21, 22, 23 and 24. This trough has a bottom 451 and two flanges 452 and 453 extending upwardly therefrom, as shown in the drawings. The flange 452 is turned in more rapidly than the flange 453, so that the overlying flanges 48 of the strip of paper 51 are positively turned in, one upon the other, and thus doubled back, as illustrated. The trough 449 is supported on two standards 454 and 450 shown in Fig. 25, which are similar to standards 419, illustrated in detail in Fig. 27. Between the standards 454 are located presser roll units 455 and 456, similar to the presser roll units 325, used in conjunction with the strip flanging mechanism G. Since the description of these units has been given the same will not be repeated. The unit 456, however, uses a narrow roll 457 instead of the grooved roll 458 of the unit 455. This is for the reason that the flanges 452 and 453, of the trough 449, approach each other so closely that insufficient room exists for a grooved roll. The trough 449, similar to the trough 318, is constructed with suitable openings 459, (Fig. 19) similar to the openings 338 of the trough 318. These openings allow the rolls of the units 455 and 456 to engage the strip of paper 51 and to progress the same along the trough 449. As the partly fabricated strip of paper 51 passes through the doubling-over device I, the flanges of the strip are turned one upon the other and secured together and to the reinforcing inserts and also to the reinforcing bars of the garment hangers.

The strip of paper 51, throughout its movement along the machine and through the doubling-over device I, has been a continuous strip and the inserts and reinforcing bars have been applied to the strip at the proper localities, while the strip was continuous. When the strip reaches the end forming device J the strip is cut into sections which are subsequently formed into the individual garment hangers. This device, in addition to cutting off the sections, gives the same the proper form and also provides the eyelets for the insertion of the hooks used with the garment hanger. The reinforcing inserts, inserted into the strip, are of sufficient length so that the end forming device J simultaneously forms the ends of two adjacent garment hangers and each insert is divided to form a reinforcing member for the end of two adjacent garment hangers.

The end forming device J is best illustrated in Figs. 5, 25 and 28. Immediately following the doubling-over device I, are provided two bearing standards 461 and 462 which are attached to the longitudinal frame members 70 and 76. It will be noted that the longitudinal frame member 76 terminates at this locality and has secured to the underside thereof the longitudinal frame member 70 which carries the folding device K and other parts of the invention as well as these standards. The bearing standards 461 and 462 are attached to the longitudinal frame member 76 at the extreme end thereof. In the lowermost portion of these standards are provided two bearings, not shown in detail in the drawings which journal a shaft 463. The upper portions of these standards have formed in them guides 464 which slidably support bearing blocks 465. These bearing blocks journal a shaft 466. The shaft 463, as best shown in Fig. 28, carries a drum 467 which is provided with a recess 468 in and in which is mounted a pad 469. The shaft 466 carries a similar drum 471. In this drum is mounted a die block 472 which carries two blade cutters 473 and 474, similar to the cutter used in the construction of paper cartons and boxes, and also two sets of punches 475 and 476. These cutters are arranged so that the same come opposite the pads 469 and operate to cut off the strip and to punch holes in the same as the strip travels between the two drums 467 and 471. A plate 477 is secured to each of the guides 464 and is shimmed to bring the shaft 466 at the proper distance away from the shaft 463 to cause the cutter blades 473 and 474 and the punches 475 and 476 to properly cooperate with the pad 469, to form the ends of the sections of the strip from which the individual garment hangers are constructed.

The pad 469 carries three prongs 478 which are adapted to engage the waste portion of the strip 51 severed by the cutting blades 473 and 474. These prongs pick up this portion of the strip and carry the same with them. As the severed portions reach the lowermost position of the drum 467, as shown in Fig. 28, a number of spring fingers 479 engage the periphery of the drum and pick off the said waste portion and free the same from the drum 467. These fingers are attached to the cross frame member 84 secured to the longitudinal frame member 70. A screw 482 attached to this bracket and provided with an adjusting nut 483 regulates the positions of the fingers with reference to the periphery of the drum 467. The tail end of the trough 449 is positioned so that the same is tangent to the two drums 467 and 471. This feeds the formed strip 51 in between the drums where the parts are cut off, as desired. To accommodate the reinforcing bars inserted into the fabricated strip a groove 484 is employed, which is formed in the drum 471 and which extends partly throughout the periphery thereof.

The drums 467 and 471 are driven in the following manner: Attached to the end of shaft 463, is a bevel gear 485. This gear meshes with another bevel gear 486, fast on the line shaft 128. A spur gear 487 is also mounted on the shaft 461 which meshes with another spur gear 488, fast on shaft 466. By this means the drums 467 and 471 are driven in unison.

The doubling-over device and strip flanging mechanism are driven from the shaft 463 of the end forming device J. This construction is best shown in Figs. 4, 5, and 25. Attached to the end of the shaft 463 is a sprocket wheel 489. A chain 491 passes over this sprocket wheel and over another sprocket wheel 492, fast on the shaft 331 of the presser roll unit 456. All of the gears 347 and 348, of the units 455 and 456, mesh with one another, as do the corresponding gears of the presser units of the strip flanging mechanism G. The first gear 347, of the unit 455, meshes with an idler gear 493 which in turn meshes with another idler gear 494. This gear in turn meshes with the last gear 348 of the presser roll unit 325 nearest the reinforcing insert cutting and applying device H. In this manner both the strip flanging mechanism G and the doubling over device I are driven from shaft 463.

The folding device K is best shown in Figs. 6, 25, 29 and 30. This device consists of a trough 495 into which the severed sections of the strip 51 are discharged, an initial folding mechanism 496 which folds the section into U-shaped form and a final folding mechanism 497 which folds the U-shaped structure into its final form. These various parts and the operating mechanism therefor will now be described in detail.

The trough 495 consists of a bottom 498 and two sides 499 and 501. The bottom 498 is constructed at its center with a relatively long opening 502 of a length somewhat greater than the cross bar of the frame of the garment hanger, leaving end portions 503 and 504, of said bottom, spaced from one another. The sides 499 and 501 extend below the bottom 498 of the trough and are formed with flanges 505 which are bolted to a table 506 at an elevation somewhat below the elevation of the bottom 498. This table is supported on legs 507 and 508 secured to the longitudinal frame member 70. A stop 509 at the end of the trough 495 terminates the movement of the section of the strip 51 from which the garment hanger is made in its travel in to said trough.

The bottom 498 of trough 495 is at the same elevation as the lines of tangency of the drums 467 and 471 of the end forming device J. The severed sections are fed from the end forming device J to the trough 495 in the following manner as best shown in Figs. 5 and 28. Immediately following the two drums 467 and 471 is a feed roll unit 511, similar to the presser roll units 325 and 456, previously described in conjunction with the strip flanging mechanism G and the doubling over device I. This unit is similarly constructed and has two rolls 512 and 513, similar to the rolls 337 and 339. The roll 512 is concave to accommodate the reinforcing bar while the roll 513 is cylindrical. Following the unit 511 is a similar feed roll unit 514 which has a lower roll 515 corresponding with the roll 512 but which has a shoe 516 instead of the roll corresponding to the roll 513. The formed sections of the strip of paper 51, on leaving the two drums 467 and 471, passes between the rolls 512 and 513 under the shoe 516 and between it and the roll 514 and is deposited upon the bottom 498 of the trough 495. The two presser roll units 511 and 514 are mounted on a block 510 which bring the line of tangency of the rolls thereof into alignment with the line of tangency of the rolls 467 and 472.

The various shafts, of the presser roll units 511 and 514, are driven by a train of gears 517, which are situated on the side of the machine opposite to the gears of the other presser roll units referred to. This construction is shown in Fig. 28. The end gear of this train is designated by the reference numeral 518 and meshes with a gear 519, fast on the shaft 463. These gears are of such proportions that the peripheral speed of the rolls 512 and 513, as well as the roll 515, is considerably greater than the peripheral speed of the two drums 467 and 471. These gears travel fast enough so that the section of the strip 51, from which a garment hanger is to be constructed, is thrown along the trough 495 until the end of the same engages the stop 509. The section, when so disposed, is ready to be operated upon by the initial folding device 496 and the final folding device 497.

The initial folding device 496 is best shown in Figs. 25 and 30. Attached to the longitudinal frame member 70 is a rearwardly extending frame 521 which includes two longitudinal angles 522 and 523 and two transverse angles 524. These various angles are riveted or otherwise secured together at the corners and are attached to the rear flange of the frame member 70. Attached to the lowermost flanges of the angles 524 are two bearings 525 which journal a shaft 526. This shaft has attached to it, at one end, an arm 527 which supports intermediate the ends of the same a cam roller 528. The cam roller 528 is adapted to ride along the surface 529 of a cam 531. Cam 531 is adjustably mounted upon a flange 532 which is attached to the shaft 128, previously referred to. An arm, similar to the arm 527, and indicated by the reference numeral 533, is also attached to the shaft 526 and is of the same length as the arm 527. Pivoted to the upper ends of these arms are two links 534 and 535 which extend toward the trough 495. These arms have attached to the ends thereof fingers 536 and 537 which extend through openings 538 and 539 in the side 499 of trough 495 and into the channel formed therein, as shown in Fig. 29. The ends of the links 534 and 535 are supported through vertically extending links 541 which extend through openings 542 in the web 79a of frame member 70. These links are attached to levers 543 which are mounted on a shaft 544. Shaft 544 is journaled in two bearings 545 attached to the lowermost flanges of the angle frame members 524. One of the levers 543 is formed with an arm 546 which carries a cam roller 547. This cam roller is adapted to engage the surface 548 of a cam 549 which is mounted on the shaft 128. The two cams 531 and 549 are so constructed that the fingers 536 and 537 are moved into the channel and trough 495, while at the uppermost ends of the openings 538 and 539 and so that the said fingers travel downwardly while in the channel of the trough and are withdrawn from the trough through the openings 538 and 539 while at the lowermost portions of said trough. To maintain the fingers 536 and 537 in proper position, two guides 551 are employed which are attached to the longitudinal frame member 70 and which have slots 552 therein of the width of the links 541. The links 541 fit snugly within said slots and travel transversely and vertically therein. These guides prevent movement of the fingers 536 and 537 in a longitudinal direction with respect to the frame member 70.

The cam rollers 528 and 547 are held in engagement with the cam surfaces with which they cooperate in the following manner. Attached to the frame member 521 is an upright 553 which is formed with two arms 554 and 555 extending outwardly therefrom. To these arms are attached two tension coil springs 556 and 557. The coil spring 557 is anchored at one end to an arm 558 fast on shaft 526. The coil spring 556 is anchored at its other end to an arm 559, fast on shaft 544.

The final folding device 497 is constructed as follows: Secured to the underside of the table 506 are two bearings 561 and 562. These bearings journal two transversely positioned shafts 563 and 564. These shafts extend outwardly beyond the side 501 of the trough 495. Shaft 563 has attached to it a bent lever 565, while shaft 564 has attached to it a similar bent lever 566. The lever 565 has attached to it a pin 567 from which issues a plate 570 while lever 566 has similarly attached to it a pin 568. When the levers 565 and 566 are in the positions shown in Fig. 6 the pins 567 and 568 are in close proximity to the end portions 503 and 504 of the bottom 498 of trough 495 and at substantially the elevations thereof. As the fingers 536 and 537 travel downwardly, the pins 567 and 568 serve as fulcrums over which the end frame members of the sections of the strip 51 are bent to make the strip U-shaped in form. These pins also serve to fold the arms of the sections of strip 51 back upon one another so that the entire folded structure may occupy a compact form.

The operating mechanism of the final folding device will now be described in detail. Pivoted to the lever 565 is a link 569, best shown in Fig. 6, which is constructed at its other end with a head 571 having a slot 573 in the same. A pivot 572 carried by the lever 566 slides in the slot 573 of the head 571. The link 569 is pivoted to the lever 565 above its axis of oscillation, while the said link 569 is pivoted to the lever 566 below its axis of oscillation. By means of this construction the two pins 567 and 568 are moved either toward each other or from each other depending upon the movement of the levers. Also, due to the slot 573, the lever 566 does not commence to operate until the slack occasioned by slot 573 has been taken up. This causes the pin 567 to first turn its frame member of the section of strip 51 inwardly before pin 568 turns its frame member inwardly. In this manner the two frame members of the sections are caused to be folded one upon the other.

Figure 6:
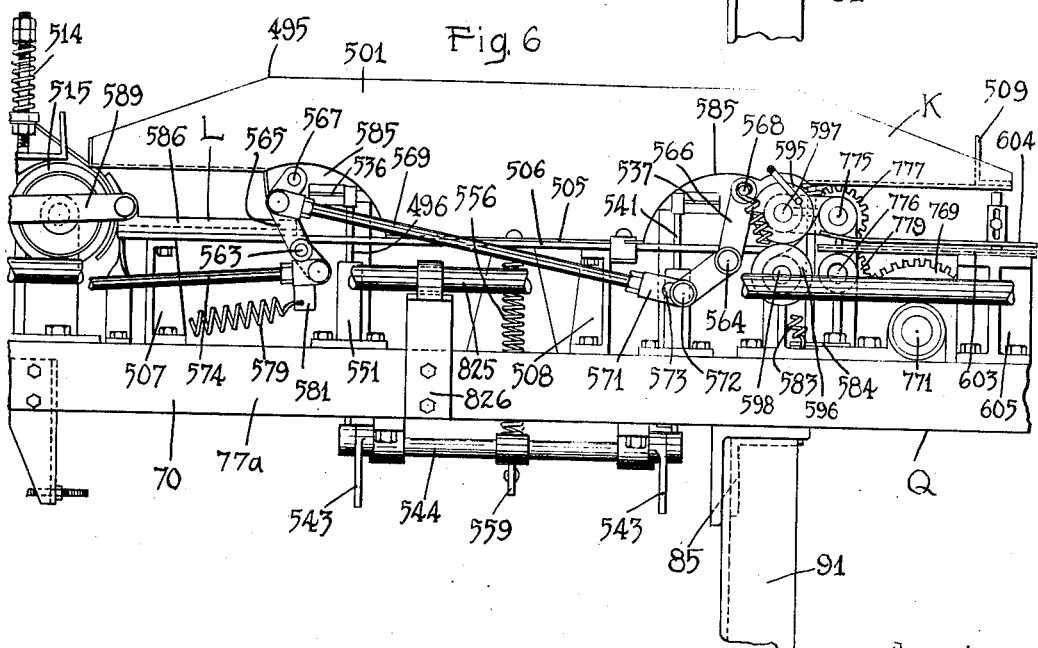
Fig. 6 is a longitudinal elevational view of the folding device and kicker.

The lever 565 has pivoted to it a link 574 shown in Figs. 5 and 6. This link extends longitudinally of the frame member 70 and is guided for longitudinal movement by means of an arm 575 which is pivoted to said link at one end and pivoted at its other end through a pintle 576 to the bearing standard 462 of the end forming device J. The end of the link 574 also carries a cam roller 577 which is adapted to engage a cam 578 which is rigidly secured to shaft 463. This cam causes periodic movement of the final folding device 497. To maintain the roller 577 in engagement with the cam 578, a tension coil spring 579 is employed which is attached to a lug 581 on one end of link 574 and to an anchor bolt 582 secured to the longitudinal frame member 70. A spring 583 is attached to the lever 566 and to an anchor 584 on frame member 70 and urges the pin 568 into its uppermost normal position. The side 501, of the trough 495, is constructed with two arcuate openings 585 through which the two pins 567 and 568 extend and in which the said pins move to swing members of the section of the strip 51 into overlying position.

The kicker L is best shown in Figs. 5, 6 and 29. Attached to the table 506, at the head end of the same, is a guide 586. Slidably mounted in this guide is a kicker bar 587 which is of substantially the same cross sectional dimensions as the dimensions of the folded section of strip 51. This bar travels in a longitudinal direction and engages the end of the folded section, which is formed upon the table 506, and moves the same longitudinally thereof and toward the tail end of the trough 495. This kicker bar is formed with an upstanding lug 588 which has pivoted to it, as best shown in Fig. 6, a longitudinally extending link 589. Link 589 is pivoted to the upper end of a lever 591 (Fig. 5) which is mounted for oscillation on a pin 592 secured to the longitudinal frame member 70. This lever carries a cam roller 593 which is adapted to engage a cam 594 mounted on shaft 463. Cam 594 moves the arm 589 longitudinally and operates the kicker bar 587. A tension coil spring 590 secured to lever 591 and to an anchor 580 secured to frame member 70 holds the roller 577 in contact with cam 578.

At the end of the table 506 are two feed rolls 595 and 596 (Fig. 29). These rolls are mounted on shafts 597 and 598 which are journaled in the same manner as the shafts 336 and 331 of units 325. These shafts have mounted on them gears 601 and 602 which are driven in a manner to be presently described.

The feed rolls 595 and 596 deliver the folded structure to the channeling device M where the structure, previously flat, is formed into a cross section of channel shape with the reinforcing bar at the web and the flanges of the same extending angularly therefrom. The channeling device M is best shown in Figs. 7, 31 and 41. Following the two feed rolls 595 and 596 is a guide 603 which has a removable top 604. This guide is carried upon a standard 605 secured to the longitudinal frame member 70. Following the guide 603 are a number of flanging roll units 606, 607, 608, 609, 610 and 611. These units are identical in construction, excepting as to the shape of the rolls, and are constructed and operated the same as the presser roll units 325. The flanging roll unit 606 includes two shafts 613 and 614, similar to the shafts 336 and 331, which carry two rolls 615 and 616. The roll 615 is shaped to fit the exterior of the channel and the roll 616 is shaped to fit the interior of the channel. The units 607, 608, 609 and 610 are similarly constructed, and the rolls thereof are similar to those of the unit 606, excepting that the faces of said rolls gradually converge so that the folded sections of strip 51 are gradually bent from planaform cross section to channel-shaped cross section as the same pass through the various rolls. Between these various rolls are mounted standards 617 which are similar to the standards 319 and which are provided with guide means similar to that shown in conjunction with the standards 319 and which direct the folded sections from one flanging roll unit to the next.

The two angle frame members 93 and 94, which lie in continuation of the frame member 70 are attached to the same at the locality of the leg 92 and the flanging roll unit 608. For this reason the standards 617 are omitted between the flanging roll units 608, 609, 610 and 611 and rigid guides 618 and 619 are used in place thereof which are directly attached to said frame members. These guides are spaced to fit upon the interior of the channeled section. Also the lower rolls are omitted in conjunction with the two units 610 and 611. It will thus be seen that the flat sections, on entering the channeling device M, are gradually bent into a form having a channel shape section.

The flange roll units 606, 607, 608, 609, 610 and 611 are constructed similar to the presser roll units 325, previously referred to, and are driven in much the same manner. These units have shafts 762 and 763 (Fig. 41) which correspond to the shafts 333 and 332 of the units 325. The shaft 613 and 614 of these units, correspond to the shafts 336 and 331 of the unit 325. Shafts 762 and 763 have gears 764 and 765 secured to them which mesh with one another. The gear 764 meshes with a gear 766, fast on shaft 613, while another gear 768, fast on shaft 614 meshes with the gear 765. All of the gears 768 and 765 of the various units 606 to 611 mesh with one another, thereby driving all of the flanging rolls of the flange roll units. The shaft 673 also has attached to it a spur gear 767 which meshes with a spur gear 769, fast on a countershaft 771. This countershaft is journaled in bearings 772 (Fig. 31) attached to the channel frame member 70. The shaft 771 carries a bevel pinion 773 which meshes with a bevel gear 774, fast on shaft 128.

The feed rolls 595 and 596 are supported on shafts 597 and 598. These rolls are mounted similarly to the presser roll units 325 and include shafts 775 and 776. The shaft 775 carries a spur gear 777 which meshes with a spur gear 779, fast on shaft 776. Another spur gear 778 on shaft 776 meshes with a spur gear 769, mounted on shaft 771. The gear 777 meshes with the spur gear 601 fast on shaft 597, previously referred to, and the gear 779 meshes with the spur gear 602 fast on shaft 598 and also previously referred to. In this manner the two rolls 595 and 596 are driven.

Both the glue setting conveyor and the glue drying conveyor employ a link belt and driving mechanism therefor which will now be described in detail. This link belt is shown in Figs. 7 and 8 and is indicated in its entirety by the reference numeral 621. This link belt consists of a number of links 620, one of which has been shown in detail in Fig. 37. This link consists of two plates 622 and 623 joined to the plates 622a and 623a of the adjoining link by means of a pin 624. A spacer 625 holds the plates in proper spaced relation. Attached to the plates 622 and 623 are angles 626 and 627 which are of such dimensions as to be snugly received between the edges 628 of the flanges 95 of angle frame members 93 and 94. A bar 629 is attached to these angles and overlies the flanges 95 supporting the links of the chain belt 621 intermediate the ends thereof and holding the same in alignment. This plate has attached to it a lug 631, which fits upon the interior of the flanged sections of the strip 51 and serves as a support for the same, while the said sections pass through the glue setting conveyor and the glue drying conveyor O. The lugs 631 are of such length that the same substantially come in contact with one another and form a continuous support for the formed sections along the runs of the link belt 631.

The chain belt 621 is carried at one end by a sprocket wheel 632 which is attached to a shaft 633. This shaft is journaled in bearings 634 attached to a base plate 635. Base plate 635 is slidably mounted in guides 636 attached to two frame members 637, secured to the legs 92 and 100 of the frame Q. An adjusting screw 638 swivelly connected to a bracket 639 secured to the base plate 635 and cooperating with a threaded nut 641, carried by the leg 100, serves to tension the belt 621 and to take the slack out of the same. The chain belt 621 is supported at its other end on a sprocket wheel 642 which is carried by a shaft 643 journaled in bearings 644, secured to the leg 99 of frame Q.

The lower run of the chain belt 621 is supported on two angles 645 and 646 which are attached to cross frame members 650 secured to the various legs 92, 100, 98 and 99 of the frame Q. The bars 629 of the links of the said chain ride upon these angles and hold the lower run of the chain belt in alignment.

The glue setting conveyor N includes three V-belts, best shown in Figs. 8, 9, 32, 33, 34 and 36. These V-belts are designated by the reference numerals 647, 648, and 649. The V-belt 647 is arranged vertically and is carried by two sheaves 651 and 652. The sheave 651 is mounted on a shaft 653 which is journaled in bearings 654 attached to a bifurcated base plate 655. The plate 655 is slidably mounted on two angles 656 and 657 and has an upstanding portion 658. A cross bar 659 is also attached to the angles 656 and 657 and is provided with a threaded boss 661 in which is screwed an adjusting screw 662. This adjusting screw engages the upstanding portion 658 and moves the plate 655 along the angles 656 and 657 whereby the belt 647 is properly tensioned. Bolts 663 hold the plate 655 adjustably secured to the angles 656 and 657. The angles 656 and 657 are supported at their head ends on brackets 664 attached to the angle frame members 93 and 94 which brackets are best shown in Fig. 32. The other end of the belt 647 is supported on the sheave 652 which is mounted on a shaft 665. This shaft is journaled in bearings 666, mounted on a bracket 667, best shown in Figs. 9, 33 and 34, which is attached to the angle frame members 93 and 94. The angles 656 and 657, previously referred to, were described as supported at their head ends on the brackets 664. These angles are supported at their other ends on arms 681 formed with bearings 682 which are journaled on the shaft 665 (Fig. 33). In this manner the tail ends of the angles 656 and 657 are supported by the shaft 665.

The lower run 668 of belt 647 extends immediately above the lugs 631 of the chain belt 621. This run is urged toward the said lugs by means of a number of presser roll units 669, best shown in Fig. 9, which are identical in construction. One of these units has been shown in cross section and will be described in detail. This unit comprises a lever 671 pivoted through a pintle 672 to the downwardly extending legs of the angles 656 and 657 previously referred to. This lever is formed with a forked arm 673 between which is journaled an idler sheave 674, adapted to engage the run 668 of the belt 647. The lever 671 is constructed with an arm 675 projecting outwardly therefrom and which is positioned near the upper flanges of the angles 656 and 657. Across the said flanges of the angles 656 and 657, is provided a plate 676 which is constructed with a hollow boss 677. In this boss is disposed a compression coil spring 678 which engages the arm 675 and urges the lever 671 downwardly to cause the sheave 674 to bear against the run 667 of belt 647. An adjusting screw 679 regulates the pressure of the spring 678 upon the lever 671.

The two belts 648 and 649 urge the flanges of the folded sections of the strip 51 toward one another and toward the lateral surfaces of the lugs 631. Both of these belts operate in the same manner and are similarly supported and guided, and only the belt 649 and the structure associated therewith will be described in detail.

The belt 649 is carried at the head end of the machine on a sheave 683 which is journaled on a pintle 684 secured to a sliding block 685. This block is supported on a U-shaped bracket 686 which is attached to the angle frame member 94. The block 685 has a lug 687 extending upwardly therefrom which is threaded to receive an adjusting screw 688. This screw passes loosely through an opening in a lug 689, formed on the bracket 686. A nut 691 is threaded on the screw 688 and engages the lug 689. This nut serves to urge the block 685 in a direction to tighten the belt 647. The other end of the belt 647 is supported on a sheave 692 which is mounted on a shaft 693. This shaft is journaled in a bearing 694 secured to the bracket 667.

The inner run 695, of belt 649, is urged toward the lugs 631 by means of a number of presser roll units 704, one of which is shown in detail in Fig. 36. For supporting these units two angles 699 and 701 are employed which are attached to the angles 93 and 94 and which are arranged with one of the flanges 702 resting upon the aforementioned angles and with the other flange 703 extending upwardly therefrom. The unit 704 comprises a swinging arm 696 which is constructed with a boss 697. A screw 698 passes through said boss and serves as a pivot therefor. This screw is threaded into the lower flange 702 of the angle 701 and supports said swinging arm 696 for movement toward and from the run 695 of the belt 649. The arm 696 carries a shaft 705 on which is rotatably mounted a sheave 706 engaging the run 695 of belt 649. Arm 696 is constructed with an abutment 707 against which is seated one end of a compression coil spring 708. This spring is seated at its other end against a collar 709 formed on a screw 711 threaded into the flange 703 of the angle 701. By means of the screw 711 the pressure of the spring 708 can be varied to cause the run 695 of the belt 649 to be urged against the flanges of the formed section of the strip 51.

The shaft 665 forms the drive shaft of the three V-belts 647, 648 and 649 and is driven as follows: Attached to the end of the shaft 665 is a spur gear 712. This gear meshes with a spur pinion 713, fast on a shaft 714, which is journaled in bearings 715 secured to the angle frame members 93 and 94. Shaft 714 also carries a bevel gear 716 which meshes with a bevel gear 718 on the shaft 128.

The shaft 693 is driven from the shaft 665 in the following manner: Attached to the shaft 665 is a bevel gear 719 which is disposed adjacent the bearing 682. This bevel gear meshes with a bevel gear 721, fast on a shaft 693. The bevel gears 719 and 721 are so arranged that all of the runs 695 and 668 of the belts 647, 648 and 649 travel in the same direction. The various gears, forming the drives for these belts, are so designed that the surface speeds of the various belts are the same, and are the same as that of the chain belt 621.

The glue drying conveyor O is best shown in Figs. 10, 11, 35, 40 and 46. This conveyor utilizes the chain belt 621, previously referred to, and also another chain belt 722. This chain belt consists of links 723 which are pivoted together. The chain belt 722 is supported at one end on a sprocket wheel 724 which is mounted on a shaft 725. Shaft 725 is journaled in bearings 726 formed on two plates 727 which are attached to the angle frame members 93 and 94. These plates overlie the said angles and bolts 728 pass through slots 729 in said plates and are threaded in the angle frame members 93 and 94. Adjusting screws 731 are threaded into angle lugs 732 which are attached to the angle frame members 93 and 94. These screws engage similar angle lugs 733 attached to the plates 727. The other end of the chain belt 722 is similarly supported by a sprocket wheel 734 which is mounted on a shaft 735. Shaft 735 is journaled in bearings 736 which are attached to the angle frame members 93 and 94.

Each of the links 723 of the chain belt 722 has attached to it a construction best shown in Figs. 38 and 39. The link 723, illustrated in these figures, is provided with a raised attachment lug 737 which has secured to it a U-shaped guide member 738 having flanges 739 projecting outwardly therefrom. Attached to this guide member is a U-shaped holder 741 which is constructed with a web 742 and flanges 743 projecting therefrom. The forward ends of the flanges 743 are flared outwardly, as indicated at 744, for a purpose to be presently more fully described. Between the flanges 743, of the holder 741, is provided a rubber insert 745, shown in Fig. 39. This insert is constructed with ribs 746 which extend outwardly from the web 742 of the holder 741. The holder 741 straddles the flanges of the formed section of the strip 51 and the ribs 746 urge the web of the flange section of the said strip into engagement with the lugs 631 of the chain belt 621.

The lower run 747 of the chain belt 722 is supported in the following manner: At intervals, along the two longitudinal angle frame members 93 and 94, are provided supporting rods 748 which support two guides 749. These guides are constructed with angle members 751 at the upper portions thereof and Z-shaped members 752 at the lower portions thereof forming facing grooves 753. The flanges 739 of the guide members 738 ride upon the legs 754 of the Z-shaped members 752 and hold the run 747 in proper position. Within the grooves 753 is a board 755 which rests against the under surfaces of the flanges of the angle members 751 and which forms a guide along which the flanges 739 of the guide members 738 slide. Adjustment of the guides 749 can be made through nuts 756, threaded on the ends of the rods 748. The upper run of the chain belt 722 rides upon the board 755, as best shown in Figs. 10 and 35.

The glue drying conveyor O is driven in the following manner: Attached to the shaft 735 is a bevel gear 757. This bevel gear meshes with a bevel pinion 758, fast on the line shaft 118. The shaft 735 has attached to it a spur gear 759. This spur gear meshes with another spur gear 761, fast on shaft 643. This latter shaft carries the chain belt 621 which cooperates with the chain belt 722.

The ejector P is shown in detail in Figs. 11, 12 and 40. Immediately following the glue drying conveyor O is a plate 782 which is attached by means of a bracket 783 to the channel frame member 94. This plate has an upturned ear 784 which engages the formed garment hanger as it leaves the glue drying device O and prevents it from following around the chain belt 722. The garment hanger slides over a fixed longitudinal guide 785 which is attached to a plate support 786, secured to the longitudinal frame members 93 and 94. Following the guide 785 is a feed roll 787 which is mounted upon a shaft 788. This shaft is journaled in a bearing 789 secured to the frame member 94. A sprocket pinion 791 is secured to the shaft 788 and is driven by a chain 792 which passes over another sprocket wheel 793, secured to the shaft 735. By means of this construction the roller 787 is driven at a peripheral rate of speed greater than the rate of travel of the hangers leaving the glue drying conveyor O. The feed roll 787 directs the garment hanger upon another guide 794 which is attached to a plate support 795 secured to the undersides of the longitudinal frame members 93 and 94. Overlying the guide 794 is a supporting bar 796 which carries a number of spring fingers 797 which bear down upon the upper surface of the guide 794 and hold the garment hangers in contact therewith. The bar 796 is supported through brackets 798 attached to the longitudinal frame member 94.

Positioned adjacent the feed roll 787, is an electrical switch mechanism 801. This switch mechanism includes a base 802 secured to the longitudinal frame member 93. On this base is mounted two spring contact fingers 803 and 804 which are normally open. A lever 805 is pivoted to the base 801 and has an arm 806 adapted to engage the spring contact finger 804 and to move the same in contacting relation with respect to the finger 803. The said lever includes another arm 807 which carries a roller 808 so positioned that the same is adapted to engage one of the flanges of the garment hanger as the same passes along beneath the feed roll 787. A tension coil spring 809, acting between the arm 806 and the base 802, forces the said arm toward the contact finger 804 and closes the contacts. When a garment hanger passes beneath the feed roll 787, its flange moves the roller 808 outwardly and the contact of the switch mechanism 801 is open. When the roller reaches the end of the flange of the garment hanger the roller moves toward the feed roll 787 and spring 809 moves an arm 806 in a manner to close the contact of the switch mechanism 801.

The switch mechanism 801 is connected to an electro-magnet 811 which is attached to a bracket 812, mounted on a cross bar 813, secured to the two frame extensions 102 and 103, previously referred to. The electro-magnet 811 has an armature 814 of the plunger type which is moved inwardly into the same against the action of a compression coil spring 815. This armature has pivoted to it a link mechanism 816 which is connected to an arm 817 of a bell crank 818. This bell crank is pivoted at 819 to two brackets 821 secured to the frame extensions 102 and 103. Lever 818 carries an arm 822 having a finger 823 at the end of the same which is adapted to move downwardly as the plunger 814 is attracted by the electro-magnet. As will be noted in Fig. 40 the two frame extensions 102 and 103 are spaced from one another to provide a space 825 therebetween. As the garment hangers are fed upon the guide 794, through the feed rolls 787, each succeeding garment hanger pushes the preceding hanger ahead and into the space below the arm 822 and finger 823. The switch mechanism 801 is so positioned that, when the garment hanger is properly positioned below the finger 823, the electro-magnet 811 is energized and the said finger moved downwardly to discharge the garment hanger downwardly from the machine and into a suitable receptacle which may be placed beneath the two frame extensions 102 and 103.

In order to control the operation of the machine a shut-off bar 825 is employed which extends throughout the length of the machine and which is guided for sliding movement in a number of brackets 826 secured to the various frame members of the frame Q. The clutch 117 of the transmission R may be thrown in and out by a clutch lever 827. This lever is pivoted to the bar 825 at 831 and to a bearing 832 secured to the angle frame member 93. It will thus be apparent that reciprocation of said bar along its guides throws the clutch in and out of engagement. At the head end of the machine the bar 825 is constructed with a cam 828. This cam is adapted to engage a pin 829 on the bent lever 309 forming a part of the gluing device D. Upon movement of the lever 309 downwardly, as viewed in Fig. 13, the arms 244 are depressed and the strip 51 freed from the glue roller 242. In this manner the driving mechanism for the entire machine, excepting the glue rollers is stopped which are independently operated by motor 271. These glue rollers continue to rotate so as to prevent sticking of glue and gumming-up of the gluing device. When, however, the arms 244 are lowered the strip is out of contact with the glue rolls and the same may be manually manipulated within the machine.

The operation of the machine is as follows: The roll of paper, indicated by the reference numeral 50, is mounted on the reel A and the strip 51 thereof passes to the printing press B. On arriving at the printing press the same passes between the idler rolls 149 and 151 and through the feed rolls 153 and 154. From these rolls the strip passes over the platen 142 and over the idler roller 159. From this roller the strip passes over the idler roller 162 and over to the scoring device C. On reaching the scoring device the strip is fed into the feed device 225 which directs it in between the two scoring drums 218 and 221. The scored strip leaves the drum through the guide 243 and passes beneath the glue roller 242 where the same is properly coated with glue along the marginal portions thereof. The strip then continues underneath the plate 235 and under the table 275, where the same is again picked up by the presser roll units 325 of the strip flanging mechanism G. As the same reaches the strip flanging mechanism reinforcing bars are fed by the slide 285 of the reinforcing bar feed mechanism F and removed from the reinforcing bar rack E and deposited upon the centrally glued portion of the strip 51. As the strip passes through the various presser roll units of the strip flanging mechanism G, the flanges of the same are turned upwardly therefrom and the strip then arrives at the reinforcing insert cutting and applying device H. This device forms and severs sections from a strip 409 of paper unrolled from a roll 398 and deposits them upon a drum 368. This drum carries the inserts around and releases them upon the flanged strip 51 at the portions of the strip from which the ends of the garment hangers are constructed. As the strip continues its travel through the machine, the same passes through the doubling-over device I, in which the various presser roll units 455 and 456 cooperating with the trough 449, as disclosed in Figs. 21 to 24 inclusive, turn over the flanges of the flanged strip 51 and cause the same to adhere together to form the strip into a closed flattened, tubular structure in which the reinforcing bars are disposed in the center of the same. On leaving the doubling-over device I the strip 51 reaches the end forming device J at which it is cut off into sections from which the individual garment hangers are constructed. This device forms the ends of the sections with the holes in which the hooks are subsequently placed when the hangers are erected for use. This end forming device includes the two drums 467 and 471, blade cutters 473, etc., and the pad 469 by means of which the ends are formed and severed. The sections are delivered from the end forming device J by means of the feed roll units 511 and 514 to the folding device K. In the folding device the fingers 536 and 537 move the section downwardly over the pins 567 and 568 which forms the section into U-shaped form. Thereafter the said pins move toward one another to cause the folded parts to overlie the intermediate portion of the section whereby the frame members of the hanger are arranged in final position and deposited upon the table 506. The kicker bar 587 of the kicker L removes the folded garment hanger from the table 506 and delivers it to the feed rolls 595 and 596. These feed rolls carry the sheet to the channeling device M. In the channeling device the flanging roll units 606 to 611 successively form the garment hangers into a channel-shaped cross section. The garment hangers, so formed, are carried to the glue setting conveyor N in which the various belts 648, 649 and 647, cooperating with the chain belt 621 securely press the parts together and cause the glue to set and to hold the parts in proper position. In passing through the glue drying conveyor O, the various holders 741 hold the garment hangers in flanged position while the glue dries. At the end of this conveyor ejector P causes the completely formed and dried garment hangers to be deposited downwardly through the frame of the machine where the same may be collected in a suitable container positioned beneath the same for the purpose.

Changes in the specific form of our invention, as herein disclosed, may be made within the scope of what is claimed without departing from the spirit of our invention.

Having described our invention, what we claim as new and desire to protect by Letters Patent is:

1. In combination, means for continuously forming a flat tubular structure from a strip of paper, means for inserting a reinforcing bar into the tubular structure during formation thereof, means for cutting off the tubular structure into sections of predetermined length and means for folding the tubular structure transversely at spaced localities to form a garment hanger having a cross bar and frame members hingedly connected thereto.

2. In combination, means for continuously forming a flat tubular structure from a strip of paper, means for severing from the tubular structure sections thereof and means for simultaneously folding said sections transversely at spaced localities to form a garment hanger having a cross bar and side frame members hingedly connected thereto.

3. In combination, means for forming a flat tubular structure from a strip of paper, means for severing from the tubular structure sections thereof, means for folding said sections transversely to form a garment hanger having a cross bar and side frame members hingedly connected thereto and means for forming the cross bar and side members of the garment hanger U-shaped in cross section to reinforce the same.

4. In combination, a scoring device for scoring an elongated strip of paper longitudinally and transversely, a gluing device for applying adhesive to the strip, a flanging mechanism for first folding the strip along certain of the longitudinal scores to form flanges extending therefrom, a doubling over device for doubling over the flanges to form a flat tubular structure, means for cutting off sections from the tubular structure and a folding device for folding the sections transversely along the transverse scores to form a garment hanger having a cross bar and side frame members connected thereto.

5. In combination, a scoring device for scoring an elongated strip of paper longitudinally and transversely, a gluing device for applying adhesive to the strip, a flanging mechanism for first folding the strip along certain of the longitudinal scores to form flanges extending therefrom, a doubling over device for doubling over the flanges to form a flat tubular structure, means for cutting off sections from the tubular structure, a folding device for folding the sections transversely along the transverse scores to form a garment hanger having a cross bar and side frame members connected thereto and a channeling device for subsequently folding the strip along other of the longitudinal scores to give to the folded structure a form U-shaped in cross section.

6. In combination, a scoring device for scoring an elongated strip of paper longitudinally, a gluing device for applying adhesive to the strip, a flanging mechanism for first folding the strip along certain of the longitudinal scores to form flanges extending therefrom, means for inserting a reinforcing member between said flanges, a doubling over device for doubling over the flanges to form a flat tubular structure enveloping the reinforcing member and means for cutting off sections from the tubular structure.

7. In combination, a scoring device for scoring an elongated strip of paper longitudinally, a gluing device for applying adhesive to the strip, a flanging mechanism for first folding the strip along certain of the longitudinal scores to form flanges extending therefrom, means for inserting a reinforcing bar in between said flanges and applying the same to said strip, a doubling over device for doubling over the flanges to form a flat tubular structure enveloping said reinforcing bar and means for cutting off sections from the tubular structure so that each section includes one of said reinforcing bars.

8. In combination, a scoring device for scoring an elongated strip of paper longitudinally, a gluing device for applying adhesive to the strip, a flanging mechanism for first folding the strip along certain of the longitudinal scores to form flanges extending therefrom, means for inserting paper inserts upon said strip at spaced intervals, a doubling over device for doubling over the flanges to form a flat tubular structure enveloping said inserts and means for cutting off sections from the tubular structure at the localities of said inserts and through the same to provide reinforcements for the sections at each of the ends of the sections.

9. In combination, means for feeding an elongated strip of paper longitudinally, means for applying adhesive to the strip, means for feeding a second strip of paper longitudinally and in a direction transverse of said first named strip, means for cutting off and attaching to said first named strip portions from the second named strip, means for folding the marginal portions of the first named strip over and upon the severed portions of the second named strip and means for cutting off sections from the first named strip at the localities of the inserted portions of the second named strip.

10. In combination, feed means for moving an elongated strip of paper longitudinally, a gluing device for applying adhesive to the strip, forming means for folding over portions of the strip along longitudinal lines and securing the same together to form a doubled over structure, a channeling device for folding the folded structure transversely into a form, channel-shaped in cross section and conveyor having strip engaging members thereon for holding the folded structure in channel-shaped form during the setting of the adhesive.

11. In a garment hanger forming machine for forming garment hangers from a strip of paper, a conveyor for moving the formed garment hangers longitudinally of the strip, an ejector for removing the formed garment hangers from the conveyor and a trip actuated by the presence of one of said garment hangers for ejecting a garment hanger previously moved by said conveyor.

12. In combination, feed means for continuously moving an elongated strip of paper longitudinally and in a given horizontal plane, means for forming from the strip a folded structure, means for severing sections from the folded structure, a folding device for folding the sections transversely to form garment hangers, said means operating to move the folded structure downwardly into a plane lower than said first mentioned plane and means for moving the folded garment hangers longitudinally of the strip and in said lower plane.

13. In combination, means for forming a flat tubular structure from a strip of paper, means for severing from the tubular structure sections thereof, means for folding said sections transversely at spaced localities to form a garment hanger having a cross bar and side frame members hingedly connected thereto, and to bring the side frame members in overlying position upon said cross bar, and means for simultaneously forming the cross bar and side members of the garment hanger while in overlying position U-shaped in cross section to reinforce the same.

14. In combination, means for continuously forming a tubular structure from a strip of paper, means for inserting reinforcing members upon said strip at spaced localities, means for severing the strips intermediate the reinforcing members and means for folding the separated portions transversely in proximity to the ends of said reinforcing member to form a garment hanger having a cross bar including the reinforcing member and side frame members hingedly connected thereto and free from the reinforcing member.

15. In combination, a scoring device for scoring an elongated strip of paper longitudinally, a gluing device for applying adhesive to the strip, a flanging mechanism for first folding the strip along certain of the longitudinal scores to form flanges extending therefrom, means for inserting reinforcing members between said flanges and spaced longitudinally from one another, a doubling device for doubling over the flanges to form a flat tubular structure enveloping the reinforcing members and means for cutting off the sections from the tubular structure at spaced localities the same distance apart as the reinforcing members.

16. In combination, feed means for moving an elongated strip of paper longitudinally, a gluing device for applying adhesive to the strip, forming means for folding over portions of the strip along longitudinal lines and securing the same together to form a doubled over structure, a channeling device for folding the folded structure transversely into a form, channel-shaped in cross section and a member having a channel-shaped socket therein for the reception of said folded structure and means for engagement with the folded structure to hold the same within said socket during the setting of the adhesive.

17. In combination, means for feeding a strip of paper longitudinally, a gluing device for applying adhesive to the strip, a pair of tangentially arranged drums disposed with their line of tangency at the plane of the strip, means for periodically depositing on one side of said drums an insert, means for causing the insert to follow along with the drum and to be deposited upon said strip, means for forming a tubular structure from the strip enveloping the inserts and means for cutting off sections from the tubular structure.

18. In combination, means for feeding a strip of paper longitudinally, a gluing device for applying adhesive to the strip, means for feeding a second elongated strip of paper longitudinally thereof and in a direction at right angles to the direction of movement of the first named strip, means for separating sections thereof and depositing the same upon said first named strip, means for forming a tubular structure from the first named strip enveloping the sections cut off from said second named strip, and means for cutting off sections from the tubular structure.

19. In combination, means for feeding a strtp of paper longitudinally, a gluing device for applying adhesive to the strip, a pair of tangentially arranged drums disposed with their line of tangency at the plane of the strip, means for feeding a second elongated strip of paper longitudinally thereof and axially of said drums and above the uppermost drum, a shear including a downwardly acting plunger adapted to cut off sections from the second named strip and depositing them upon the drum, means for causing the drum to advance the sections with the same and to deposit the sections upon the first named strip, means for forming a tubular structure out of the first named strip enveloping the sections from the second named strip, and means for cutting off sections from the tubular structure.

HENRY O. RONNING.
HARRY E. CULLEN.
EDWIN G. MONSON.
NELS H. SANDBERG.